(12) United States Patent
Cole et al.

(10) Patent No.: US 7,216,876 B2
(45) Date of Patent: May 15, 2007

(54) OCCUPANT-PROPELLED FLUID POWERED ROTARY DEVICE, TRUCK, WHEELED PLATFORM, OR VEHICLE

(76) Inventors: Jeffrey E. Cole, 40 Gold Creek Ct., Danville, CA (US) 94506; Nicolas Orand, Imagine Software Inc. Suite #900 44191 Plymouth Oaks Blvd., Plymouth, MI (US) 48170; Srihari Vijayakumar, Imagine Software Inc. Suite #900 44191 Plymouth Oaks Blvd., Plymouth, MI (US) 48170

( * ) Notice: Subject to any disclaimer, the term of this patent is extended or adjusted under 35 U.S.C. 154(b) by 10 days.

(21) Appl. No.: 11/030,480

(22) Filed: Jan. 5, 2005

(65) Prior Publication Data
US 2005/0280233 A1 Dec. 22, 2005

Related U.S. Application Data

(63) Continuation-in-part of application No. 10/874,134, filed on Jun. 21, 2004, now Pat. No. 7,040,638.

(51) Int. Cl.
*B62D 21/14* (2006.01)
*B62M 1/00* (2006.01)
*F16D 31/02* (2006.01)

(52) U.S. Cl. ............... 280/43.23; 280/87.042; 60/450

(58) Field of Classification Search ............. 280/42.23, 280/93.504, 124.112, 124.114, 87.041, 87.042; 180/307, 9.36, 6.24; 60/450, 452, 448, 413; 91/180, 220
See application file for complete search history.

(56) References Cited
U.S. PATENT DOCUMENTS

| 297,388 A | 4/1884 | Hall |
|---|---|---|
| 527,082 A | 10/1894 | Smith |
| 582,696 A | 5/1897 | Schneible et al. |
| 590,492 A | 9/1897 | Calderwood et al. |
| 787,988 A | 4/1905 | Moore |
| 793,664 A | 7/1905 | Kleindienst et al. |
| 865,117 A | 9/1907 | Muhl et al. |
| 936,173 A | 10/1909 | Schoenberg |
| 1,111,160 A | 9/1914 | Larsen et al. |
| 1,208,173 A | 12/1916 | Lenhardt |
| 1,364,471 A | 1/1921 | Ameli |
| 1,410,326 A | 3/1922 | Labak |
| 1,535,950 A | 4/1925 | Schramke |
| 1,650,450 A | 11/1927 | Jochum |
| 2,061,334 A | 11/1936 | Stone |
| 2,177,381 A | 10/1939 | Bichi |

(Continued)

FOREIGN PATENT DOCUMENTS

DE 3829318 A * 3/1990

(Continued)

*Primary Examiner*—Hau Phan
(74) *Attorney, Agent, or Firm*—Buchanan, Ingersoll & Rooney PC

(57) ABSTRACT

A device for generating rotational energy for hydraulic fluids, which includes at least one hydraulic cylinder, the at least one hydraulic cylinder comprising at least two chambers, wherein each of the at least two chambers are in fluid communication with the other. The hydraulic fluid is displaced from the hydraulic cylinder to an accumulator and a valve, which controls the release of the hydraulic fluid to a hydraulic motor. The hydraulic motor receives the hydraulic fluid from the accumulator and valve creating torque to drive a wheel or other device.

24 Claims, 15 Drawing Sheets

U.S. PATENT DOCUMENTS

| | | |
|---|---|---|
| 2,195,812 A | 4/1940 | Czarnecki |
| 2,434,546 A | 1/1948 | Breedlove |
| 2,589,449 A | 3/1952 | Stageberg |
| 2,699,649 A | 1/1955 | Messick |
| 2,852,183 A | 9/1958 | Breinig et al. |
| 2,976,698 A | 3/1961 | Muffly |
| 2,991,619 A | 7/1961 | Powell |
| 3,027,719 A | 4/1962 | Keech |
| 3,074,233 A | 1/1963 | Keech |
| 3,153,984 A | 10/1964 | Fikse |
| 3,216,363 A | 11/1965 | Snow et al. |
| 3,272,138 A | 9/1966 | Connoy et al. |
| 3,381,622 A | 5/1968 | Wilcox |
| 3,399,906 A | 9/1968 | Portnoff |
| 3,528,756 A | 9/1970 | Norlin et al. |
| 3,567,350 A | 3/1971 | Niemiec |
| 3,635,020 A * | 1/1972 | Mahlmann .................. 60/450 |
| 3,642,388 A | 2/1972 | Maistrelli |
| 3,677,141 A | 7/1972 | Lagerqvist et al. |
| 3,822,965 A | 7/1974 | Drutchas et al. |
| 3,855,791 A | 12/1974 | Quinto |
| 3,866,935 A * | 2/1975 | Nelson ................. 280/43.23 |
| 3,892,283 A * | 7/1975 | Johnson ...................... 60/413 |
| 3,971,215 A | 7/1976 | Baron et al. |
| 3,973,468 A | 8/1976 | Russell, Jr. |
| 4,040,310 A | 8/1977 | Giroux |
| 4,069,881 A | 1/1978 | Shiber |
| 4,087,105 A | 5/1978 | Amarantos |
| 4,109,466 A | 8/1978 | Keech |
| 4,111,618 A | 9/1978 | Thibault |
| 4,153,376 A * | 5/1979 | Neier ........................... 91/180 |
| 4,181,319 A | 1/1980 | Hirbod |
| 4,206,684 A | 6/1980 | Gosney et al. |
| 4,265,602 A | 5/1981 | Teruyama |
| 4,290,268 A | 9/1981 | Lowther |
| 4,319,760 A | 3/1982 | Romano |
| 4,347,047 A | 8/1982 | Shiozawa et al. |
| 4,355,542 A | 10/1982 | Tsutsumi et al. |
| 4,367,638 A | 1/1983 | Gray |
| 4,386,891 A | 6/1983 | Riefel et al. |
| 4,411,442 A | 10/1983 | Rills |
| 4,419,058 A | 12/1983 | Franklin, Jr. et al. |
| 4,451,055 A | 5/1984 | Lee |
| 4,459,807 A * | 7/1984 | Koppen ........................ 60/452 |
| 4,470,776 A | 9/1984 | Kostek et al. |
| 4,486,150 A | 12/1984 | Davis |
| 4,506,464 A * | 3/1985 | Cartner ........................ 37/91 |
| 4,541,791 A | 9/1985 | Ideta et al. |
| 4,546,990 A | 10/1985 | Harriger |
| 4,548,096 A | 10/1985 | Giocastro et al. |
| 4,582,342 A | 4/1986 | Lew et al. |
| 4,679,995 A | 7/1987 | Bristow |
| 4,688,815 A | 8/1987 | Smith |
| 4,712,633 A | 12/1987 | Suzuki et al. |
| 4,715,180 A | 12/1987 | Rosman |
| 4,738,603 A | 4/1988 | Hattori |
| 4,807,896 A | 2/1989 | Philippi |
| 4,843,950 A | 7/1989 | Heyl |
| 4,861,054 A | 8/1989 | Spital |
| 4,886,298 A | 12/1989 | Shols |
| 4,915,403 A | 4/1990 | Wild et al. |
| 4,925,372 A | 5/1990 | Hansen |
| 4,934,251 A | 6/1990 | Barker |
| 4,934,253 A | 6/1990 | Berthold et al. |
| 5,007,544 A | 4/1991 | Saotome et al. |
| 5,016,726 A | 5/1991 | Metcalf |
| 5,051,065 A | 9/1991 | Hansen |
| 5,147,183 A | 9/1992 | Gettel |
| 5,154,436 A | 10/1992 | Jez et al. |
| 5,184,536 A | 2/1993 | Arai |
| 5,199,718 A | 4/1993 | Niemiec |
| 5,218,935 A | 6/1993 | Quinn, Jr. et al. |
| 5,224,719 A | 7/1993 | Goodspeed |
| 5,239,833 A | 8/1993 | Fineblum |
| 5,266,018 A | 11/1993 | Niemiec |
| 5,280,935 A | 1/1994 | Sobocan |
| 5,292,234 A | 3/1994 | Ling |
| 5,310,202 A | 5/1994 | Goodspeed |
| 5,310,326 A | 5/1994 | Gui et al. |
| 5,320,367 A | 6/1994 | Landis |
| 5,340,131 A | 8/1994 | Smathers et al. |
| 5,423,560 A | 6/1995 | Warrick et al. |
| 5,428,958 A | 7/1995 | Stenlund |
| 5,595,067 A | 1/1997 | Maness |
| RE35,493 E | 4/1997 | Horton |
| 5,642,991 A | 7/1997 | Singleterry et al. |
| 5,687,567 A | 11/1997 | Hansson et al. |
| 5,689,956 A | 11/1997 | Reboredo |
| 5,772,225 A | 6/1998 | Brackett |
| 5,778,671 A | 7/1998 | Bloomquist et al. |
| 5,806,896 A | 9/1998 | Sato et al. |
| 5,811,037 A | 9/1998 | Ludwig |
| 5,839,737 A | 11/1998 | Kruczek |
| 5,915,322 A | 6/1999 | Adams |
| 5,938,224 A | 8/1999 | Brackett |
| 5,947,495 A | 9/1999 | Null et al. |
| 5,992,148 A | 11/1999 | Satake |
| 6,000,513 A | 12/1999 | Richards |
| 6,015,279 A | 1/2000 | Yamane |
| 6,022,201 A | 2/2000 | Kasmer |
| 6,032,968 A | 3/2000 | Chattin |
| 6,035,976 A | 3/2000 | Duhamel |
| 6,050,357 A | 4/2000 | Staelin et al. |
| 6,050,796 A | 4/2000 | Waong et al. |
| 6,079,727 A | 6/2000 | Fan |
| 6,123,396 A | 9/2000 | Siegel |
| 6,131,933 A | 10/2000 | Fan |
| 6,149,409 A | 11/2000 | Palakodati et al. |
| 6,152,711 A | 11/2000 | Van Wijk et al. |
| 6,173,981 B1 | 1/2001 | Coleman |
| 6,182,779 B1 | 2/2001 | Hosoda |
| 6,217,398 B1 | 4/2001 | Davis |
| 6,315,313 B1 | 11/2001 | Huang |
| 6,371,501 B2 | 4/2002 | Jenkins |
| 6,422,845 B1 | 7/2002 | Wong et al. |
| 6,425,313 B1 | 7/2002 | Kleinedler et al. |
| 6,425,450 B1 * | 7/2002 | Lansberry .................. 180/9.36 |
| 6,443,471 B1 | 9/2002 | Mullen |
| 6,450,448 B1 | 9/2002 | Suzuki |
| 6,467,560 B1 | 10/2002 | Anderson |
| 6,488,296 B2 | 12/2002 | Ireton |
| 6,499,964 B2 | 12/2002 | Staton et al. |
| 6,536,788 B1 | 3/2003 | Kuncz et al. |
| 6,537,047 B2 | 3/2003 | Walker |
| 6,571,757 B1 | 6/2003 | Simpson |
| 6,592,486 B1 | 7/2003 | Arbanas et al. |
| 6,612,117 B2 | 9/2003 | Kasmer |
| 6,626,442 B2 | 9/2003 | Pahis |
| 6,629,829 B1 | 10/2003 | Shinoda et al. |
| 6,647,719 B2 | 11/2003 | Truninger |
| 6,655,936 B2 | 12/2003 | Szeszulski et al. |
| 6,659,480 B1 | 12/2003 | Newman |
| 6,663,362 B1 | 12/2003 | Lentz et al. |
| 6,682,155 B2 * | 1/2004 | Hoff et al. .................. 305/145 |
| 6,688,624 B2 | 2/2004 | Christensen et al. |
| 6,688,862 B2 | 2/2004 | Jeronymo et al. |
| 6,698,196 B2 | 3/2004 | Hashimoto et al. |

FOREIGN PATENT DOCUMENTS

FR            2702012 A1 * 9/1994

* cited by examiner

|  |  | 1 | 2 | 3 | 4 |
|---|---|---|---|---|---|
|  |  | Fixed Displacement | Variable Displacement | Fixed Displacement With Bypass Valve 285 | Variable Displacement With Bypass Valve 285 |
| A | Generalized Motors | Fig. 16A | Fig. 16B | Fig. 16C | Fig. 16D |
| B | One Direction of Torque and One Axle | Fig. 16E | Fig. 16F | Fig. 16G | Fig. 16H |
| C | Two Directions of Torque and One Axle | Fig. 16I | Fig. 16J | Fig. 16K | Fig. 16L |
| D | One Direction of Torque and Two Axles | Fig. 16M | Fig. 16N | Fig. 16O | Fig. 16P |
| E | Two Directions of Torque and Two Axles | Fig. 16Q | Fig. 16R | Fig. 16S | Fig. 16T |
| Pneumatic motors (▽) can replace the hydralic motors (▼) in any of the embodiments shown in FIG. 15 and FIG. 16A-T ||||||

FIG. 15

OCCUPANT-PROPELLED FLUID POWERED ROTARY DEVICE, TRUCK, WHEELED PLATFORM, OR VEHICLE

CROSS-REFERENCE TO RELATED APPLICATIONS

This application is a continuation-in-part of commonly assigned U.S. patent application Ser. No. 10/874,134, filed Jun. 21, 2004, now U.S Pat. No. 7,040,630.

FIELD OF THE INVENTION

This invention relates to a system of powering devices that either requires, or benefit from, rotational power or torque in their operation. This invention utilizes hydraulic power to convert linear motion into rotational motion. More particularly, this system can be applied to a truck, wheeled platform, or a vehicle, utilizing hydraulic power, and more particularly for a skateboard or skateboard truck, which utilizes hydraulic fluid to power the skateboard by converting linear motion to rotational motion.

BACKGROUND OF INVENTION

Skateboarding is a popular sport and for some is even a means of transportation. One typical problem a skateboarder encounters is the need to propel the skateboard forward for example, when the slope of the terrain is too shallow and does not allow gravity to pull the skateboard and rider down the slope. Typically, the skateboarder will place one foot on the skateboard and utilize the other foot to push or propel the skateboard forward. This pushing motion, however, can become tiresome and may detract from the more pleasurable experience of riding the board with both feet on it.

In addition, skateboards often do not provide a sensation for the rider that is similar to the gains and losses in speed encountered when turning, curving, and straightening ones path when snowboarding downhill or surfing ocean waves due to the requirement to periodically remove one foot from the board to propel the skateboard. Many geographic areas do not have the terrain required to allow gravity to do some or all the work of propelling the skateboard.

Furthermore, many skateboards suffer from distracting wobbles and vibration at higher rates of speed. Thus, the use of the hydraulic system will tend to dampen the vibrations and provide for a much more stable and controlled feeling for the occupant.

Although, there have been innovations in the self-powered skateboard, none of the innovations have utilized a hydraulic system and method of converting linear motion into rotational motion to propel the skateboard forward.

Accordingly, what is needed is a system and method utilizing a hydraulic system to convert linear motion into rotational motion to propel a skateboard forward and provide a sensation similar to snowboarding or surfing without having to put one foot on the ground to propel the skateboard and without the need for gravity or inclined surfaces.

SUMMARY OF THE INVENTION

In one aspect of the invention, a rotary device for hydraulic fluids is designed to generate controlled rotational energy and comprises at least one hydraulic cylinder, the at least one hydraulic cylinder comprising at least two chambers, wherein each of the at least two chambers are in fluid communication with the other; an accumulator system, wherein the accumulator system is comprised of at least two accumulators configured to receive the hydraulic fluid from the at least one hydraulic cylinder, a valve system adapted to receive the hydraulic fluid from the at least two accumulators, and two pressure relief valves; at least one directional control valve, which is configured to receive hydraulic fluid from the valve system within the accumulator system; at least one hydraulic motor adapted to receive the hydraulic fluid from the at least one directional control valve, wherein the internal components of the hydraulic motor are configured to rotate by the displaced hydraulic fluid creating torque; and a reservoir adapted to receive the hydraulic fluid from the at least one hydraulic motor, the directional control valve or the pressure relief valve and return the hydraulic fluid to the at least one hydraulic cylinder.

In a further aspect of the invention, a hydraulic skateboard comprises a skateboard deck; a pair of skateboard trucks, each skateboard truck being adapted to be attachable to the skateboard deck and comprising at least one axle protruding from the truck and wherein each of the at least one axles is configured to receive at least one wheel. The skateboard truck further comprises: at least one hydraulic cylinder, the at least one hydraulic cylinder comprising at least two chambers, wherein each of the at least two chambers are in fluid communication with the other; an accumulator system, wherein the accumulator system is comprised of at least two accumulators configured to receive the hydraulic fluid from the at least one hydraulic cylinder, a valve system adapted to receive the hydraulic fluid from the at least two accumulators, and two pressure relief valves designed to reduce excessive pressure buildup in the accumulators; at least one directional control valve, which is configured to receive hydraulic fluid from the valve system within the accumulator system; at least one hydraulic motor adapted to receive the hydraulic fluid from the at least one directional control valve, wherein the internal components of the hydraulic motor are configured to rotate by the displaced hydraulic fluid creating torque to drive the at least one axle protruding from the truck; and a reservoir adapted to receive the hydraulic fluid from the at least one hydraulic motor or a directional control valve or pressure relief valve and return the hydraulic fluid to the at least one hydraulic cylinder; and wherein the skateboard truck is attachable to the skateboard deck at least one end of the at least one hydraulic cylinder, such that movement of the skateboard deck from a first position to a second position causes the at least two hydraulic cylinder chamber to displace a hydraulic fluid from one hydraulic cylinder chamber to the other hydraulic cylinder; and configured to be attachable to the skateboard deck at a pivot point, wherein the pivot point is approximately symmetrically positioned between a first connection point and a second connection point of the at least one hydraulic cylinder and the skateboard deck; and at least one wheels attached to the at least one axle of each skateboard truck.

In another aspect of the invention, a device for generating rotational energy for hydraulic fluids comprises at least one hydraulic cylinder, the at least one hydraulic cylinder comprising at least two chambers, wherein each of the at least two chambers are in fluid communication with the other; and an accumulator system comprising: at least two accumulators configured to receive the hydraulic fluid from the at least one hydraulic cylinder; a valve adapted to receive the hydraulic fluid from the at least two accumulators; at least one hydraulic motor adapted to receive the hydraulic fluid from the valve, wherein the hydraulic motor is configured to rotate by the displaced hydraulic fluid creating torque; and a reservoir adapted to receive the hydraulic fluid from the at least one hydraulic motor and return the hydraulic fluid to the at least one hydraulic cylinder.

In a further aspect of the invention, a hydraulic skateboard comprises a skateboard deck; a pair of skateboard trucks, each skateboard truck being adapted to be attachable to the skateboard deck and comprising at least one axle protruding from the truck, wherein each of the at least one axles is configured to receive at least one wheel; at least two hydraulic cylinders, each of the at least two hydraulic cylinders in fluid communication the other via a conduit, and wherein the skateboard deck is attachable to the at least two hydraulic cylinders, such that movement of the skateboard deck from a first position to a second position causes the hydraulic cylinders to displace a hydraulic fluid through the conduit to the other hydraulic cylinder; an accumulator system comprising: at least two accumulators configured to receive the hydraulic fluid from the at least two hydraulic cylinders; a valve adapted to receive the hydraulic fluid from the at least two accumulators; and a reservoir adapted to receive the hydraulic fluid from the at least one hydraulic motor and return the hydraulic fluid to the at least one hydraulic cylinder; at least one hydraulic motor adapted to receive the hydraulic fluid from the at least two hydraulic cylinders, wherein the hydraulic motor is configured to rotate by the displaced hydraulic fluid creating torque to drive the at least one axle and configured to be attachable to the skateboard deck at a pivot point, wherein the pivot point is approximately symmetrically positioned between a first connection point and a second connection point of the at least two hydraulic cylinders and the skateboard deck; and at least two wheels attached to the at least one axle of each skateboard truck.

In another aspect of the invention, a method of powering a device comprises providing a hydraulic system comprising: at least one hydraulic cylinder, the at least one hydraulic cylinder comprising at least two chambers, wherein each of the at least two chambers are in fluid communication with the other; at least two accumulators configured to receive the hydraulic fluid from the at least one hydraulic cylinder; a valve system adapted to receive the hydraulic fluid from the at least two accumulators; at least one hydraulic motor adapted to receive the hydraulic fluid from the valve system, wherein the hydraulic motor is configured to rotate by the displaced hydraulic fluid creating torque; and a reservoir adapted to receive the hydraulic fluid from the at least one hydraulic motor or the accumulators and return the hydraulic fluid to the at least one hydraulic cylinder; compressing one chamber of the at least one hydraulic cylinder; expanding the other chamber of the at least one hydraulic cylinder, wherein the compressing and expanding of the two chambers displaces a hydraulic fluid to the at least two accumulators to release a pressurized hydraulic fluid to the valve system and at least one hydraulic motor to create torque.

The above aspects of this invention are more fully explained in reference to the drawings and general disclosure herein.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 15 shows a table of hydraulic motors and configurations that can be incorporated into the various embodiments with references to hydraulic circuits drawn in FIGS. 16A–16T FIGS. 16A-16T show a series of hydraulic circuitry diagrams showing a number of hydraulic motors that can be used with the embodiments as shown in FIGS. 1, 5–7, 9–12, 14, and 17.

DESCRIPTION OF THE INVENTION

Figure 1:
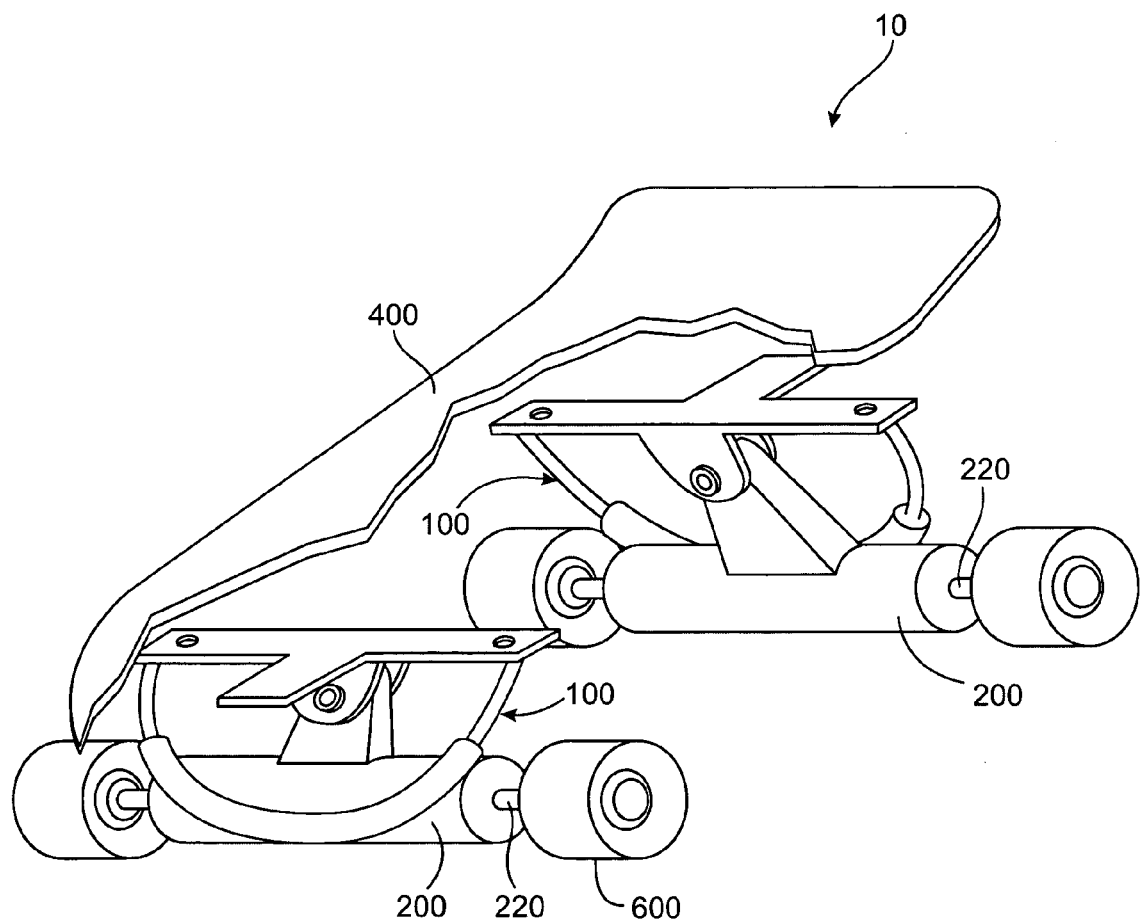
FIG. 1 shows a perspective view of an occupant-propelled device in the form of a skateboard with a portion of the skateboard deck cutaway.

FIG. 1 shows a perspective view of an occupant-propelled device configured to dampen vibrations and wobbles that a skateboarder can experience at high speeds. The device 10 comprises at least one hydraulic cylinder 100, a housing 200 having at least one axle 220, a platform 400, and at least one wheel 600.

Figure 2:
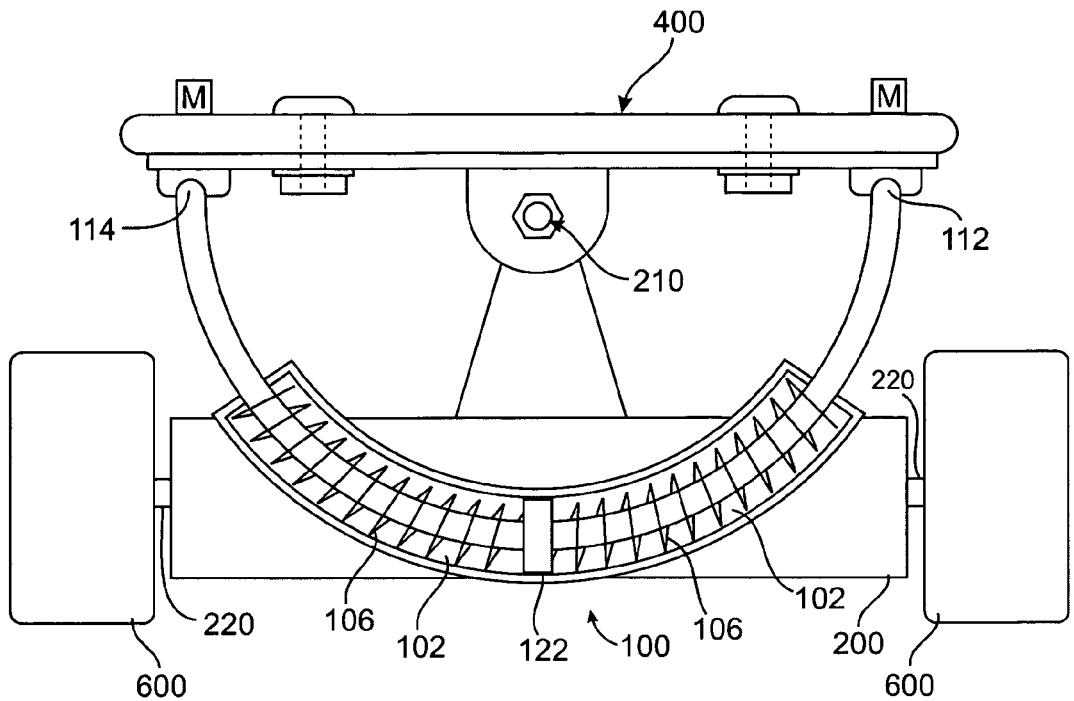
FIG. 2 shows a partial cutaway of a cross sectional end view of a skateboard illustrating one embodiment.
Figure 3:
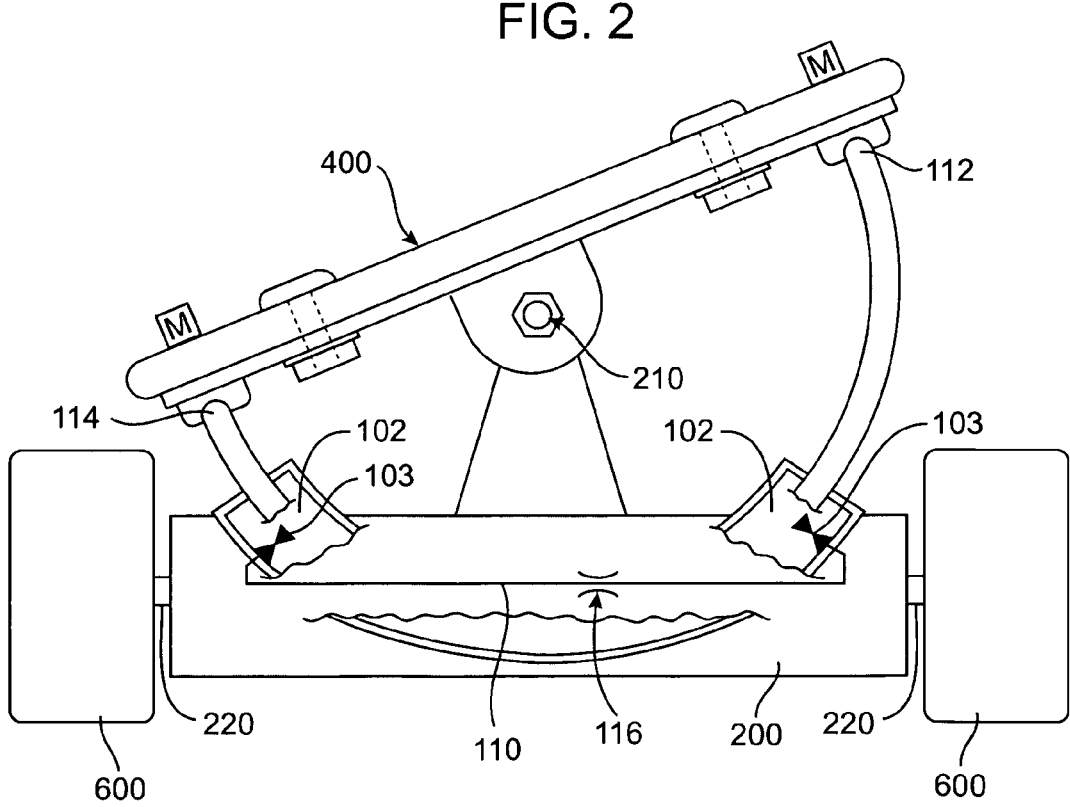
FIG. 3 shows a partial cutaway of a cross sectional end view of the skateboard as shown in FIG. 2 including hydraulic circuitry symbols.

FIGS. 2 and 3 are end views of the device 10 as shown in FIG. 1. FIG. 2 shows the device 10 at rest with a horizontal platform 400. FIG. 3 shows the device 10 not at rest with the platform 400 dipping to the left. The device 10 comprises at least one hydraulic cylinder 100 comprising at least two chambers 102. The at least two chambers 102 are in fluid communication with each other through a single conduit 110 which connects to an inlet/outlet port 103 in each chamber 102.

As shown in FIG. 2, the at least one cylinder 100 comprises a semi-circular double-ended-piston-rod having a first connection point 112 and a second connection point 114 affixed to the at least one platform 400. In this embodiment, the at least one hydraulic cylinder 100 is preferably a single double-ended-piston-rod-spring-centered hydraulic cylinder 100; however, it can be appreciated that other types of cylinder arrangements can be used. Preferably each connection point 112, 114 of the hydraulic cylinder 100 is attached with suitable fixed connections to the platform 400. However, it can be appreciated that the hydraulic cylinder 100 can be attached to the platform 400 with suitable pivoting or flexible connections to the platform 400. It can also be appreciated that it is not necessary to use a semi-circular hydraulic cylinder and that other cylinder configurations can be used.

The at least one hydraulic cylinders 100 as shown in FIG. 3 is adapted to displace a hydraulic fluid from one of the hydraulic chambers 102 to the other hydraulic chamber 102 when compressed, after passing through a housing 200 via a conduit 110 which connects the two chambers 102. It can be appreciated that the conduit 110 can be a flexible or rigid hydraulic conduit, which can be located internal or external to the housing 200. Additionally, the conduit 110 can be designed with an adjustable restrictor valve 116 to dampen or restrict the rate at which the hydraulic fluids flow from one chamber 102 to the other chamber 102. The two chambers 102 are separated by a movable piston 122, which separates the two chambers 102 of the at least one hydraulic cylinder 100 from each other. It can be appreciated that the hydraulic fluid can be any suitable liquid or gas including but not limited to water, mineral oil, or oil. It can be appreciated that the hydraulic system could be replaced with a similar pneumatic system using air or other suitable gas as a replacement for the liquids. Pneumatic embodiments of these devices may or may not require fluid or gaseous communication between the chambers 102.

Each of the two chambers 102 further includes a spring-like element 106 configured to provide resistance within the chambers 102 within the at least one cylinder 100 while the hydraulic fluid is being displaced from one chamber 102 to the other chamber 102. Any suitable spring-like or resistive device can be used within or external to the hydraulic chambers 102 without departing from the present invention.

Gravitational force, centrifugal force and the force derived from the dipping of the platform 400 to the left or the right or up and down will actuate the hydraulic cylinder 100. In operation, one of the chambers 102 of the hydraulic cylinder 100 compresses, while the other chamber 102 of the hydraulic cylinder 100 expands forcing the hydraulic fluid from the compressed hydraulic cylinder chamber 102 into the expanding hydraulic cylinder chamber 102. The expanding hydraulic cylinder chamber 102 creates a volume of reduced pressure to suction the hydraulic fluid into the hydraulic cylinder chamber 102.

The housing 200 as shown in FIGS. 1–3 is a skateboard truck. However, it can be appreciated that the housing 200 can be a skateboard truck, or any other desirable enclosure for internal components of the hydraulic system. The housing 200 is attachable to the platform 400 at a pivot point 210. It is preferable that the pivot point 210 is approximately equal distance (or symmetrically positioned) from the connection points 112, 114 to the platform 400, however, it can be appreciated that the pivot point 210 can be at a distance that is not an equal distance or centrally located. The housing 200 further comprises at least one axle 220 adapted to receive at least one wheel 600.

The housing 200 can further include a conduit 110 connecting the two chambers 102 to one another or alternatively, the conduit 110 can be outside of the housing 200. If the conduit 110 is outside of the housing 200, the conduit 110 can be contained within the hydraulic cylinder 100 or outside of the cylinder 100. It can be appreciated that the device 10 comprising a single double-ended-piston-rod-hydraulic cylinder 100 as shown in FIGS. 1–3 can be designed without a housing 200, wherein the cylinder 100 further comprises the conduit for flow between the two chambers of the cylinder, at least one axle 220 and a means for attaching the cylinder 100 to the deck of the skateboard or platform 400.

The platform 400 as shown in FIGS. 1–3 is preferably affixed to each end of a single double-ended-piston-rod hydraulic cylinder 100 at connection points 112, 114. The movement of the platform 400 from a first position to a second position (i.e., side to side, or up and down) causes the at least one hydraulic cylinder 100 to displace a hydraulic fluid from one of the at least two hydraulic cylinder chambers 102 to the other hydraulic cylinder chamber 102 which expands to receive the hydraulic fluid and can dampen or eliminate the vibrations to varying degrees by restricting the size of the fluid conduit which connects the two chambers 102, that a skateboarder can experience as a result of the speed of the skateboard.

The at least one wheel 600 is preferably a skateboard wheel or suitable wheel having a bearing which can be attached to the at least one axle 220. The at least one axle 220 preferably protrudes from truck 200 and is configured to receive a wheel 600. It can be appreciated that the skateboard can be equipped with one hydraulic truck in the front or rear of the skateboard and one standard truck at the opposite end of the skateboard. Alternatively, multiple hydraulic trucks can be mounted on the skateboard.

Figure 4:
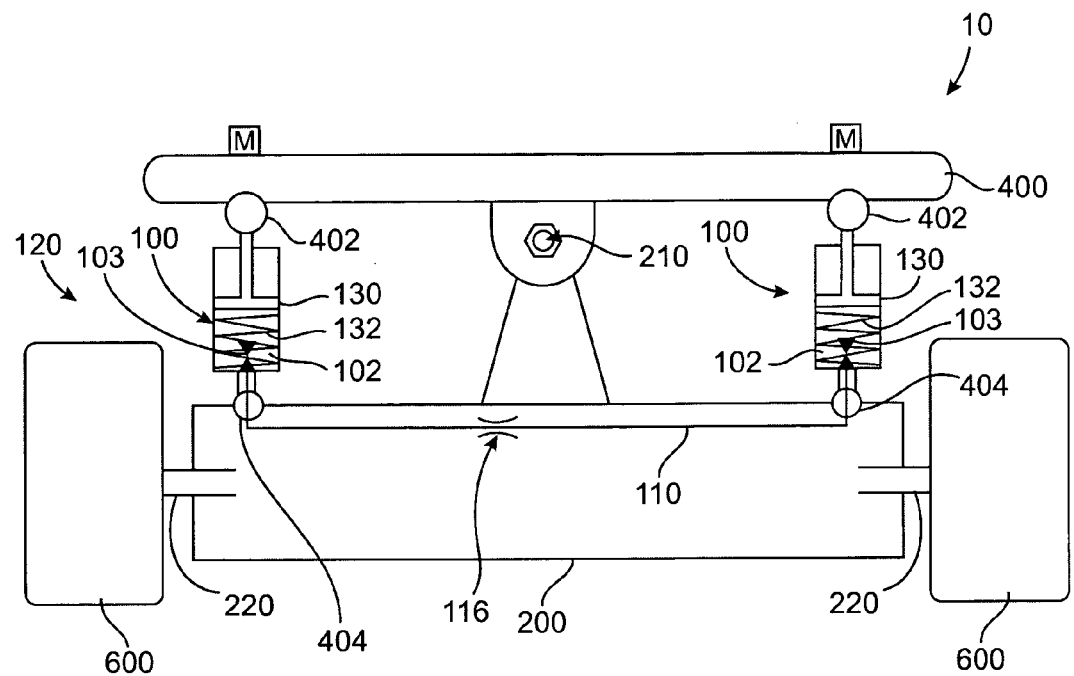
FIG. 4 shows a partial cutaway of a cross sectional end view of a skateboard including hydraulic circuitry symbols illustrating another embodiment.

FIG. 4 is an end view of a device 10 comprising at least two hydraulic cylinders 100, each having at least one chamber 102, including a circuit diagram illustrating the hydraulic system 120. As noted by ISO 1219-1 prime mover symbol, M, the hydraulic system 120 is powered by the movement of the platform 400.

As shown in FIG. 4, the device 10 comprises at least two hydraulic cylinders 100 affixed to the platform 400 at a first connection 402 and to the housing 200 at a second connection 404. Preferably one end of each hydraulic cylinder 100 is attached to the platform 400 with suitable pivoting or flexible connections 402. FIG. 4 shows a ball joint at the flexible connections 402, 404; however, the hydraulic cylinders can be attached to the platform 400 and housing 200 with any suitable flexible or pivoting connection. The two hydraulic cylinders 100 are attached with suitable pivoting or flexible connections 404 to any convenient location on the housing 200. Each of the at least two hydraulic cylinders 100 are in fluid communication with the other via a conduit 110.

As shown in FIG. 4, each of the at least two hydraulic cylinders 100 is adapted to displace a hydraulic fluid from within the cylinder 100. For some hydraulic cylinders 100, the hydraulic cylinder 100 will comprise a piston 130, a chamber 102, and an inlet/outlet port 103, and a spring-like element 132 configured to provide resistance within the chambers 102 of the cylinder 100 when the hydraulic fluid is being displaced. It can be appreciated that the hydraulic cylinders 100 can be hydraulic single acting, double acting, telescopic, pneumatic, and rod-less, with or without springs or any other suitable hydraulic cylinder without departing from the present invention.

The device of FIG. 4 operates based on the gravitational force, centrifugal force and the force derived from the movement or dipping of the platform 400 to the left or the right or up and down to actuate the hydraulic cylinders 100. In operation, one of the hydraulic cylinders 100 compresses, while the other hydraulic cylinder 100 expands forcing the hydraulic fluid from the compressed hydraulic cylinder 100, after passing through the housing 200 of the truck and a conduit 110 into the expanding hydraulic cylinder 100. The expanding hydraulic cylinder 100 creates a volume of reduced pressure to suction the hydraulic fluid into the hydraulic cylinder 100.

The housing 200 as shown in FIG. 4 is a skateboard truck. The housing 200 is attachable to the platform 400 at a pivot point 210. It is preferable that the pivot point 210 is approximately equal distance (or symmetrically positioned) from each of the at least two hydraulic cylinders 100, however, it can be appreciated that the pivot point 210 can be at a distance that is not an equal distance nor centrally located. The housing 200 comprises at least one axle 220 adapted to receive at least one wheel 600.

The platform 400 is affixed to the at least two hydraulic cylinders 100. The movement of the platform 400 from a first position to a second position (i.e., side to side, or up and down) causes the hydraulic cylinders 100 to displace a hydraulic fluid from one of the at least two hydraulic cylinders 100 to the other hydraulic cylinder 100 which expands to receive the hydraulic fluid, which dampens or eliminates the vibrations that a skateboarder can experience as a result of the speed of the skateboard. The degree to which the fluid dampens the vibrations can be engineered by changing the dimensions of the conduit 110 to be more or less restrictive to fluid flow or by adding an adjustable restrictor valve 116.

The housing 200 comprises at least one axle 220 adapted to receive at least one wheel 600. The at least one axle 220 preferably protrudes from the housing 200 and is configured to receive a wheel 600. Preferably, the at least one wheel 600 is a skateboard wheel. The at least one skateboard wheel 600 is equipped with standard skateboard bearings. It can be appreciated that the skateboard can be equipped with one hydraulic truck in the front or rear of the skateboard and one standard truck at the opposite end of the skateboard. Alternatively, multiple hydraulic trucks can be mounted on the skateboard.

Figure 5:
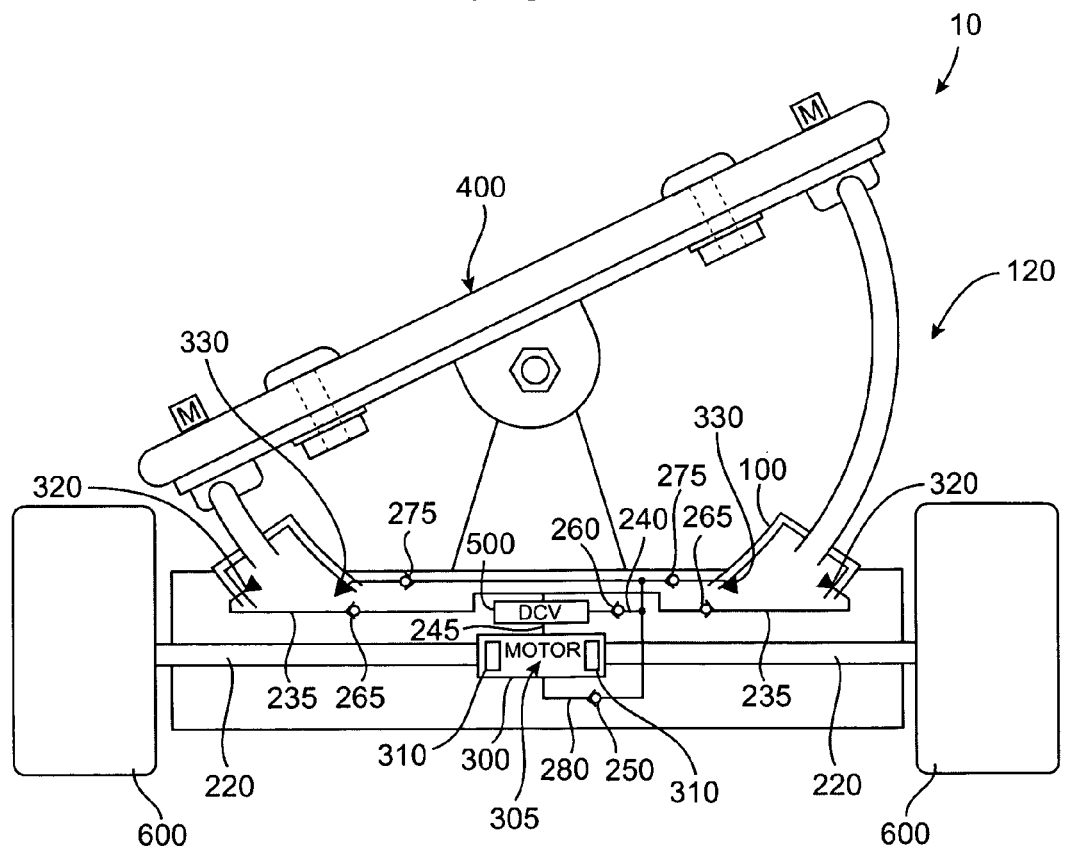
FIG. 5 shows a partial cutaway of a cross sectional end view of a skateboard including hydraulic circuitry symbols illustrating a further embodiment.
Figure 6:
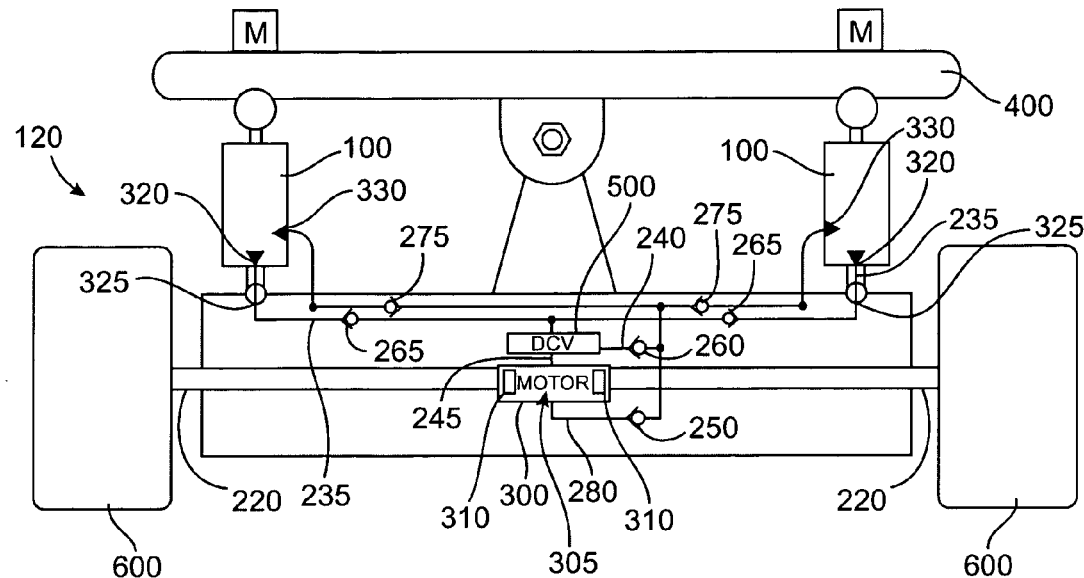
FIG. 6 shows a partial cutaway of a cross sectional end view of a skateboard including hydraulic circuitry symbols illustrating another embodiment.

FIGS. 5 and 6 show alternative embodiments of FIGS. 3 and 4, respectively, further comprising at least one hydraulic motor 300 adapted to receive the hydraulic fluid from either chamber 102 of the at least one cylinder embodiment as shown in FIG. 3 or from either of the at least two hydraulic cylinders 100 as shown in FIG. 4. The hydraulic motor 300 comprises at least one rotor 310 configured to rotate by the displaced hydraulic fluid creating torque to drive the at least one axle 220.

The hydraulic cylinders 100 are adapted to displace the hydraulic fluid from the hydraulic cylinders 100 when compressed. The hydraulic motor 300 is adapted to receive a displaced hydraulic fluid from the hydraulic cylinder 100 or the at least two hydraulic cylinders 100, wherein the rotor 310 of the hydraulic motor 300 is caused to rotate by the displaced hydraulic fluid creating torque to drive an axle 220 of a wheel 600.

FIGS. 5 and 6 include modified circuit diagram for an embodiment of an occupant-propelled device such as a skateboard having a fixed displacement or variable displacement hydraulic motor 300. FIGS. 5 and 6 show a hydraulic motor 300 having a pair of drive axles 220. The drive axles 220 preferably comprise at least one axle 220 that can be disengaged from the motor 300, such that the disengaged axle will be fixed and will not rotate. This fixed axle will contain a standard skateboard wheel equipped with standards skateboard bearings. Disengaging one of the drive axles from the motor enables the two wheels to rotate at different rotational velocities, which may be preferable for housings 200 which may be designed to also steer the device or skateboard. In addition, it can be appreciated that the motor 300 can have either one direction of rotational torque or two directions of rotational torque. The skateboard may be propelled by the rider in immediate response to the steering of the skateboard, whether turning left or right by providing torque to the drive axle 220 in response to the compression of the hydraulic cylinder or hydraulic cylinders 100 located symmetrically across a longitudinal axis of the platform 400 in the form of a skateboard deck.

The torque can be provided in either one direction of axial rotation or both, depending on the type and construction of the hydraulic motor. In addition, the direction of rotation for motors 300 with only one direction of torque can be either clockwise or counterclockwise depending on which side of the device 10 the motor 300 is located and whether the hydraulic device 10 is positioned at the front end or back end of the platform 400. Although torque may be provided in only one direction, the rotor 310, axles 220, or the wheels 600 mounted to them, can spin in either direction.

The hydraulic motor 300 can be a variable displacement motor, such as vane motors or axial piston motors or any other type hydraulic motor 300 that can provide variable displacement or fixed displacement capacity. If a variable displacement motor is used, the variable displacement motor is preferably pressure balanced, such that the rider will experience a relatively narrow range of resistive forces when turning, regardless of the speed at which the occupant is traveling on the skateboard. The variable displacement motor allows its displacement capacity to vary in response to the speed of the axial rotation of its internal components 305 and axles 220 and to the pressure delivered by the compression of the hydraulic fluid from one chamber 102 to the other chamber 102. It is the intent of this invention's design to allow the rider to feel a relatively consistent feel of resistance, within the inventions nominal range of operation, regardless of the speed at which the skateboard is traveling.

The platform 400 or skateboard deck as shown in the FIGS. 5 and 6 are affixed to the at least one hydraulic cylinder 100 or the two cylinders 100, wherein the platform 400 is adapted to move from a first position to a second position to displace the hydraulic fluid within the hydraulic cylinders 100. The at least one wheel 600 is attachable to the axle 220 protruding from either the at least one cylinder 100 or housing 200 (FIG. 5) or the housing 200 (FIG. 6) and configured to provide the device 10 a means to move laterally over a surface.

In operation, the device 10 in the form of a skateboard is propelled forward by the shifting of the bodyweight of a rider of the skateboard. In operation, the rider propels the device 10 by shifting their body weight to the left or the right. Typically, the skateboard will turn in response to the shifting of the platform from side to side or up and down. However, it can be appreciated that the at least one cylinder 100 or housing 200 (FIG. 5) or the housing 200 (FIG. 6) or skateboard truck can be configured to not turn when the platform 400 or deck of the skateboard is tilted to the left and right. As a result of the shifting of the rider's bodyweight, the skateboard deck dips to the left or right, respectively, which causes the hydraulic fluid located within the chambers of a cylinder 100 or the at least two hydraulic cylinders 100 to flow to the hydraulic motor 300. The internal components 305 within the hydraulic motor 300 are caused to rotate by the displaced hydraulic fluid creating torque to drive the axle 220 and the wheels 600.

The platform 400 in the form of a skateboard deck as shown in FIGS. 1–6 is composed of fiberglass, metal, plastic, wood, or wood composite or any suitable material for a skateboard deck and may be configured to be constructed in one or more pieces. In addition, the platform 400 can have variable degrees of stiffness and flexibility to maximize the hydraulic system based on the weight of the rider and the riders skateboarding style, i.e. gradual turns or a more aggressive pumping action of the skateboard deck. It can be appreciated that although the platform 400 is shown as a skateboard deck, any type of platform 400 can be used, such that the platform 400 can be modified for use in moving furniture or other heavy items on a platform 400, wherein the apparatus is propelled by a rocking motion. In addition, it can be appreciated that a heavier item preferably would be on a different platform than those that compress the hydraulic cylinders. For example, a stable platform 400 can be used for the load. Meanwhile, separate rocking or alternating platforms for example a stair climbing type motion, can drive the hydraulic cylinder or cylinders 100. Alternatively, the system can be used with a plurality of platforms 400, wherein each of the platforms 400 controls a hydraulic cylinder 100 as shown in FIG. 7.

Figure 7:
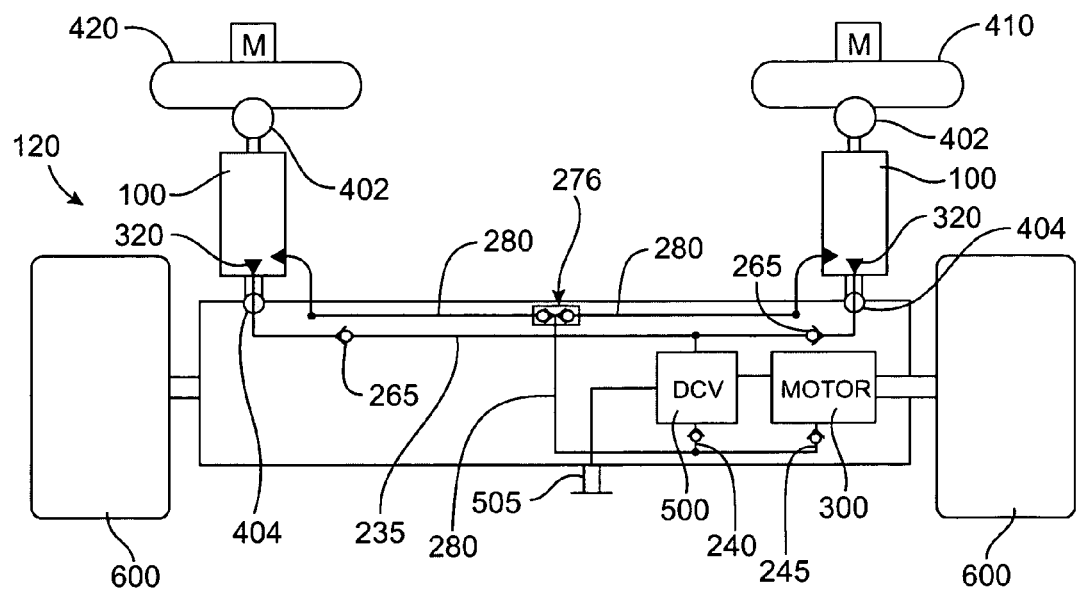
FIG. 7 shows a partial cutaway of a cross sectional end view of a skateboard including hydraulic circuitry symbols illustrating a further embodiment.

FIG. 7 illustrates an alternative embodiment of the present invention, wherein the platform 400 further comprises at least two separate platforms 410, 420. As shown in FIG. 7, each of the at least two separate platforms 400 controls a hydraulic cylinder 100. Each hydraulic cylinder 100 is attached to the platform 400 with suitable fixed, pivoting or flexible connections 402. The opposite end of each of the two hydraulic cylinders 100 is attached with suitable fixed, pivoting or flexible connections 404 to any convenient location on the housing 200. It can be appreciated that the embodiment shown in FIG. 7 can be adapted to any of the embodiments described herein. It can be appreciated that these alternate forms of platforms can integrated with any of the embodiments in FIGS. 1–6, 9–12, and 14.

Figure 8:
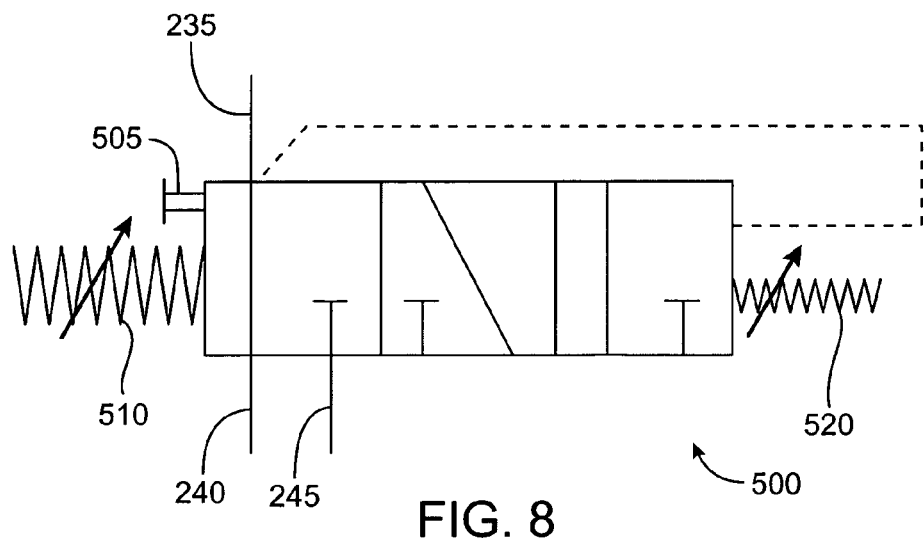
FIG. 8 shows a circuit diagram of a directional control valve.

It can be appreciated that the embodiments as shown in shown in FIGS. 5, 6, and 7 can further comprise a directional control valve 500 as shown in FIG. 8. The directional control valve 500 is configured to direct the hydraulic fluid to flow either through the hydraulic motor 300 or to bypass the hydraulic motor 300. The route the hydraulic fluid travels can be a function of the hydraulic pressure at the head of, or the pressure differentials across, the valve 500. For example, if the hydraulic pressure is too low or too high, the hydraulic fluid will bypass the motor 300, such that the motor's internal components 305 are allowed to spin freely. It can be appreciated that unless the hydraulic fluid is allowed to bypass the motor 300, the motor 300 may not have a free-spin state, which is desirable for coasting or gliding.

The directional control valve 500 preferably comprises a pair of tension screws to manually adjust one or more springs 510, 520 to minimum and maximum pressure settings. The minimum and maximum pressure settings define a range within which hydraulic fluids will engage the hydraulic motor 300. It can be appreciated that a sensor, a programmable microprocessor or other desirable device for setting a minimum and a maximum pressure range can be used. It can further be appreciated that a switch 505 can be used to lock the directional control valve 500 into a position that causes the hydraulic fluid to bypass the motor 300. If the switch is used to bypass the hydraulic motor 300, the switch effectively becomes an on/off switch for the motorized functionality of the invention. If pressures created by the compression of the hydraulic cylinder are within the manually adjusted operational range of the directional control valve 500, the hydraulic motor 300 will be engaged and may impart torque to the drive axle 220 of the hydraulic motor 300.

The hydraulic system 120 preferably provides a continuous variable transmission through the use of a variable displacement hydraulic motor rather than a fixed displacement hydraulic motor, such that at rest, the variable displacement hydraulic motor 300 is spring centered and has no volumetric displacement capacity and allows the internal components to spin freely without providing torque. At slower speeds, the motor's 300 volumetric capacity is increased towards its maximum by internal hydraulic pressure acting against the spring force to allow some relatively larger amount of fluid within the hydraulic system to pass through the variable displacement hydraulic motor 300 with fewer rotations of the motor's internal parts. As angular velocity of the drive axle 220 increases, the motor's volumetric per rotation displacement capacity automatically decreases and lets a relatively smaller amount of the fluid in the closed hydraulic system to pass through per rotation. Regardless of the speed at which the skateboard is traveling, when the motor 300 is engaged, a similar amount of hydraulic fluid passes through the motor 300 per unit of time and the motor 300 will continue to provide torque due to the automatically varying displacement capacity of the motor. Torque will diminish as the displacement capacity approaches zero at higher speeds, effectively defining the upper nominal range of operation at faster velocities. At zero displacement capacity the hydraulic motor 300 imparts no torque, allows no fluid to pass through, and the motor's internal components 305 will spin freely within the motor housing.

Torque is preferably provided by the hydraulic motor 300 in both directions of axial rotation clockwise and counterclockwise, when they are engaged by an appropriate amount of hydraulic pressure. Alternatively, the hydraulic motor 300 can provide torque in only one direction of axial rotation, clockwise or counterclockwise, depending on the which side of the truck the motor 300 is located and the position of the trucks relative to the front or leading end of the skateboard. Additionally, each hydraulic motor 300 can have a no-torque resting state, which allows the drive axles 220 to rotate freely when the hydraulic pressures are not appropriate to engage the hydraulic motors 300.

The hydraulic motor 300 can further comprise a motor bypass valve 285 as shown in half of the motors 300 detailed in FIGS. 15 and 16, which alternately connects and disconnects direct fluid communication between inlet chamber 286 of the hydraulic motor 300 and the discharge chambers 288 of the hydraulic motor 300. The bypass valve 285 enables continuous fluid communication between the inlet and discharge chambers of the hydraulic motor 300 when the remaining fluids in the hydraulic system 120 are bypassing the hydraulic motor 300. The bypass valve 285 allows the hydraulic motor 300 to retain a non-zero displacement capacity in the motor's 300 free-spin state. When the bypass valve 285 is open, allowing fluid communication between the inlet 286 and discharge 288 chambers of the motor 300, the motor 300 does not have to return to a spring-centered zero displacement capacity state each time the motor 300 is disengaged from the system 120 or each time the cylinder 100 cycles between the compression and expansion phases. Rather, the motor 300 can retain non-zero displacement capacity, which the motor 300 may have adopted at the end of its last cycle of engagement by pressured hydraulic fluids. The next time the motor 300 returns to a state of engagement by pressurized fluids, the displacement capacity will be waiting at or near that level established during the prior cycle of engagement.

The bypass valve 285 also prevents the need for the displacement capacity to reset to zero during each cycle of engagement. The bypass valve 285 features will be especially effective when the axles retain a relatively constant state of angular velocity. So long as the angular velocity of the axles remains relatively constant, the motor's displacement capacity should remain relatively constant. The net effect of the bypass valve 285 is to prevent wear and tear on moving parts and to prevent the possibility of a jerky feel to the inventions function as the motor 300 would otherwise have to constantly cycle between zero displacement capacity when disengaged and a non-zero displacement capacity when the motor 300 is engaged.

The directional control valve 500 and its manually adjusted tension springs 510, 520 define the pressure range within which hydraulic fluids will engage the hydraulic motor 300 and generate non-zero displacement capacity within the motor and torque in the drive axle. Below or above this manually adjusted pressure range, the directional control valve 500 will divert hydraulic fluids and bypass the hydraulic motor 300. The pressure range within the directional control valve 500 is adjusted manually by adjusting a maximum pressure spring 510 and a minimum pressure spring 520. (See FIG. 8). At rest the directional control valve 500 is spring controlled by the maximum pressure spring 510, which provides greater force than the minimum pressure spring 520. Compression of the hydraulic cylinder 300 causes the hydraulic fluid to move from the hydraulic cylinder 100 to the directional control valve 500.

The directional control valve 500 has two end states, both of which cause the diversion of hydraulic fluids around the hydraulic motor 300, and one, or a continuum, of intermediate state that causes hydraulic fluids to engage the hydraulic motor 300. Below minimum pressures, defined by the manually adjusted tension on the minimum pressure tension spring 520, the hydraulic fluid does not engage the motor since the fluid is diverted through a bypass conduit 240 and around the hydraulic motor 300.

Alternatively, when hydraulic pressures at the directional valve 500 exceed maximum pressures defined by the manually adjusted settings of the maximum pressure tension spring 510, the hydraulic fluid does not engage the motor 300 since the fluid is diverted around the hydraulic motor 300. Between the minimum and maximum pressures defined by the manually adjusted settings of the minimum pressure tension spring 520 and the maximum pressure tension spring 510, fluids are directed by the directional control valve 500 to the hydraulic motor 300. It can be appreciated that it is not necessary to have an upper pressure range setting for this invention to function as designed. The upper pressure range setting for the direction control valve 500 is a safety feature that disengages the motor 300 if there is a system malfunction which involves excessive system 120 pressures. Drastically reducing the spring tension of the upper pressure setting can also function as a means of manually disengaging the ability of the system to provide torque while riding the skateboard.

As shown in FIGS. 5, 6, and 7, the hydraulic system 120 comprises a delivery conduit 235, the bypass conduit 240, a motor conduit 245, and a return conduit 280. In operation, the hydraulic fluid exits the hydraulic cylinder 100 through an exit port 320 into the delivery conduit 235. In the multiple cylinder embodiments of FIGS. 6 and 7, the delivery conduit 235 and the return conduit 280 preferably have sections with flexible hose or conduits to accommodate for the tilting or movement from side to side of the platform 400, cylinders 100, and housing relative to each other. However, it can be appreciated that any suitable conduit material can be used or that other fluid delivery routes between the cylinders and the housing can be accomplished. In the one cylinder embodiment shown in FIG. 5, the two chambers 102 of the cylinder 100 are preferably incorporated within the housing 200 of the hydraulic truck, such that the fluid communication occurs entirely within the housing 200. The delivery conduit 235 and the return conduit 280 are preferably contained entirely within the housing 200, as there is no differential motion required between the semi-circular housing of the single cylinder and the truck housing 200.

In the at least two hydraulic cylinder 100 embodiments shown in FIGS. 6 and 7 the hydraulic fluid flows from the hydraulic cylinders 100 through the exit port 320 and enters the housing 200 through an entrance port 325 into the delivery conduit 235. In the single cylinder embodiment shown in FIG. 5 there is not a need for the entrance port 325, which is designed to receive fluid delivered through a ball joint coupling 404. The delivery conduit 235 in all embodiments of FIGS. 5, 6, and 7 preferably has a first check valve 265, which prevents the hydraulic fluid from flowing into the hydraulic cylinder 100 through the delivery conduit 235. The hydraulic fluid then flows through the delivery conduit 235 from one cylinder chamber 102 to a junction of the delivery conduit 235 from the other or cylinder chamber 102 and a continuation of these conduits 235 to the directional control valve 500. Fluid from both delivery conduits 235 can only travel to the directional control valve 500, which directs the hydraulic fluid through the motor conduit 245 to the hydraulic motor 300 or to the bypass conduit 240.

The fluid passing through the hydraulic motor 300 exits the motor through return conduit 280. The fluid bypassing the hydraulic motor through bypass conduit 240 joins the return conduit 280. Fluid in the return conduit can flow in only one direction, which is controlled by check valves 250 and 275. Check valve 250 specifically prevents the backflow of fluids through the hydraulic motor 300. Check valve 260 prevents the backflow of fluids in the bypass conduit 240 through the directional control valve 500.

The hydraulic pressure in the delivery conduit 235, which is located upstream of the directional valve 500, provide pressure assistance to the minimum pressure tension spring 520, and directs force against the tension provided in the maximum pressure tension spring 510. The pressure range within which the directional control valve 500 will direct fluid to engage the hydraulic motor 300 can be adjustable by manually adjusting the tension on the springs 510, 520 via screws or knobs or any other suitable controlling mechanism whose controlling elements may be exposed on the exterior of the truck housing and attached to tension springs 510, 520. When the combination of upstream fluid pressure in conduit 235 and the minimum spring 520 pressure just exceeds the maximum spring 510 pressure, the directional control valve 500 will shift to an intermediate state referred to as the working pressure range. Within the working pressure range fluid will flow through motor conduit 245 to the hydraulic motor 300.

Outside of working pressure range, hydraulic fluids will bypass the motor 300 through the bypass conduit 240, and a free spin state will be established within the motor 300 and axles 220. In this embodiment, the hydraulic fluid discharged through the hydraulic motor 300 or bypassed around the hydraulic motor 300 enters the return conduit 280. The hydraulic fluid is suctioned into the opposing hydraulic cylinder 100 located on the opposite side of the housing, in a symmetrical position around the centerline of the skateboards longitudinal axis through the return conduit 280. Return conduit 280 splits at a junction and allows fluid to flow to either of the two hydraulic cylinder chambers 102. The route the fluid takes will be determined by the compression and expansion phases of the hydraulic cylinders 100. Hydraulic fluids in return conduit 280 will flow to the hydraulic cylinder chamber 102, which is expanding. Fluids within the hydraulic cylinders 100 are prevented from flowing backwards through return conduit 280 by a pair of check valves 275. Alternatively, a single directional check valve 276 (See FIG. 7) located at the junction that splits the return conduit 280 into two paths can replace the pair of check valves 275. The return conduit 280 returns the hydraulic fluid to the hydraulic cylinder 100 through an entrance port 330.

The system 120 preferably has one direction of fluid flow into the hydraulic motor 300, such that hydraulic fluid collected in the return conduit 280 and returning to one of the at least two hydraulic cylinders 100 is prevented by return check valves 250, 260 from flowing back through the motor 300 or through the bypass conduit 240 in the opposite direction, respectively. It can be appreciated that the system 120 can be designed to operate by allowing fluids to flow both directions through the motor 100. In the current embodiment the motor 300 allows fluids to pass through in only one direction such that the inlet 286 and discharge ports 288 on the motor 300 cannot be interchanged, wherein the fluid flow is into the inlet port only. In this embodiment the motors can be single-rotation or bi-rotational motors, wherein the torque can be provided in only one or in both direction of axial rotation, respectively. If the hydraulic motor is not engaged it will have a zero-displacement capacity (unless the motor is equipped with bypass valve 285) and will be in a free-spin resting state.

Check valves 275 prevent the back flow of fluid from one hydraulic cylinder chamber 102 to the other hydraulic cylinder chamber 102. It can be appreciated that although the flow of hydraulic fluid is through conduits, other suitable devices can be used for the flow of the hydraulic fluid in the hydraulic system 120.

The embodiments as shown FIGS. 5, 6, and 7 can incorporate the full suite of types of motors as shown in FIG. 15: single or dual directions of torque, single or variable displacement, single or dual axle. Alternatively if a fixed displacement motor is implemented, the system should include bypass valve 285 (see FIGS. 15 and 16) but could be designed without it.

Figure 9:
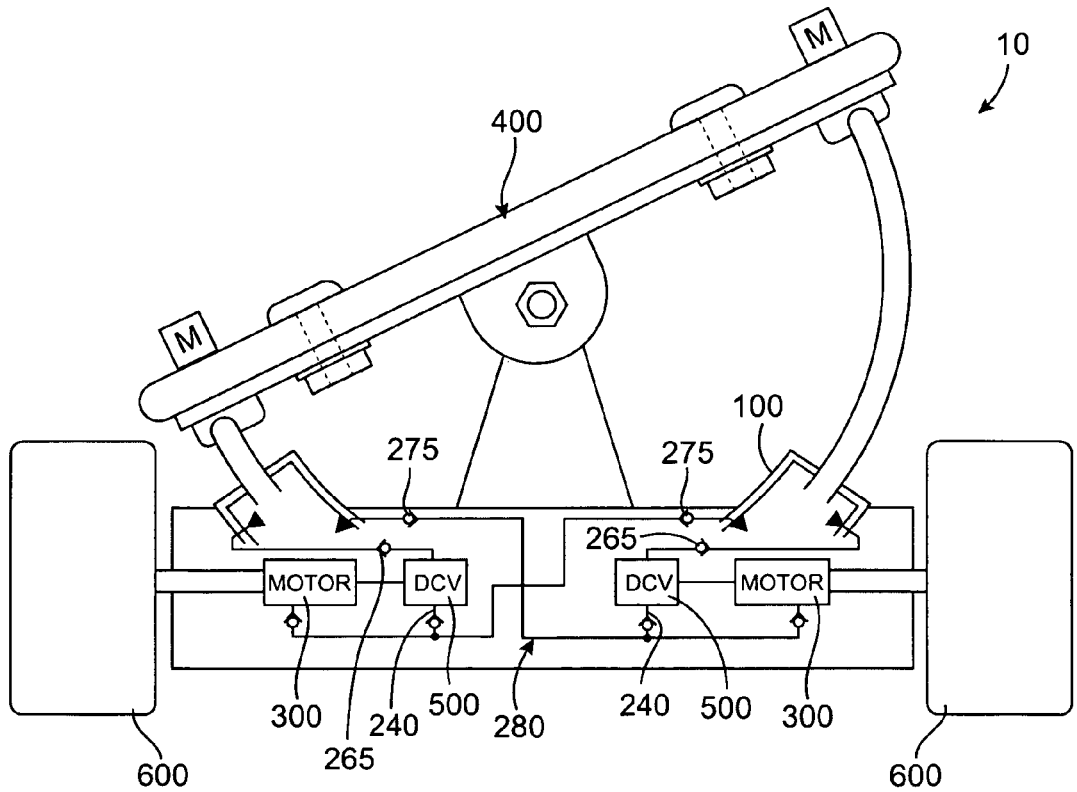
FIG. 9 shows a partial cutaway of a cross sectional end view of a skateboard including hydraulic circuitry symbols illustrating another embodiment.
Figure 10:
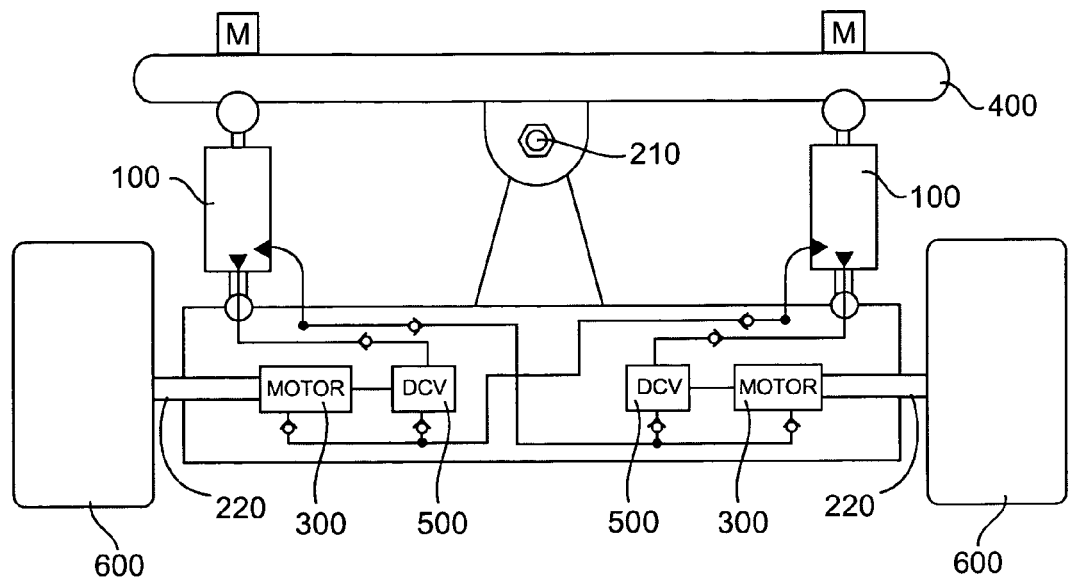
FIG. 10 shows a partial cutaway of a cross sectional end view of a skateboard including hydraulic circuitry symbols illustrating a further embodiment.

FIGS. 9 and 10 illustrate circuit diagrams for a further embodiment having multiple motors and multiple directional control valves. Functionally it operates much like the prior embodiment referencing FIGS. 5 and 6 with the distinct addition of two hydraulic motors 300 and directional control valves 500. In this embodiment, the rider propels the skateboard in immediate response to the steering the device either left or right. This embodiment can have one drive direction forward and can free spin in the other direction or the embodiment can have two directions of rotation. It can be appreciated that the hydraulic motors 300 can be any suitable types of hydraulic motors. In addition, it can be appreciated that if the hydraulic motors are variable displacement motors, the motors 300 may or may not include the bypass valve 285. If the motors 300 are fixed displacement motors, then the bypass valve 285 is preferably included.

As shown in FIGS. 9 and 10, the hydraulic motors 300 are located within the housing 200 or skateboard truck, and provide torque to the drive axles 220. Throughout this description there are dual and symmetric functional elements one directional control valve, motor, conduits drives and controls one axle, the other set of symmetrical components controls the other axle. Dual components allow the system to be propelled by one or the other motors 300 and allow the dual components to have different angular velocity for opposite wheels at the same time. Variable angular velocity in opposite wheels provides the device 10 with the ability to drive axles 220 which, during steering or turning, are rotating at different rotational velocities. The hydraulic motors 300 can be engaged in immediate response to the compression of one or the other hydraulic cylinders 100. The two hydraulic cylinders 100 are located symmetrically across the longitudinal axis of skateboard deck.

In the single cylinder embodiment shown in FIG. 9 the delivery conduit 235 from one hydraulic cylinder chamber 102 can be connected to either one or the other directional control valves 500. Regardless of which directional control valve 500 the delivery conduit 235 is connected to for a given cylinder chamber 102, the return conduit 280 must lead to the opposite cylinder chamber 102. The difference between these two alternative connection schemes determines whether the wheels on the outside of the turn or the wheels on the inside of the turn may be engaged by its respective motor 300. Conceivably, if the wheels 600 and axles 220 connected to the motors 300 on the inside of the turn provide the torque; the vehicle may achieve greater speeds than the alternative connection scheme.

Figure 11:
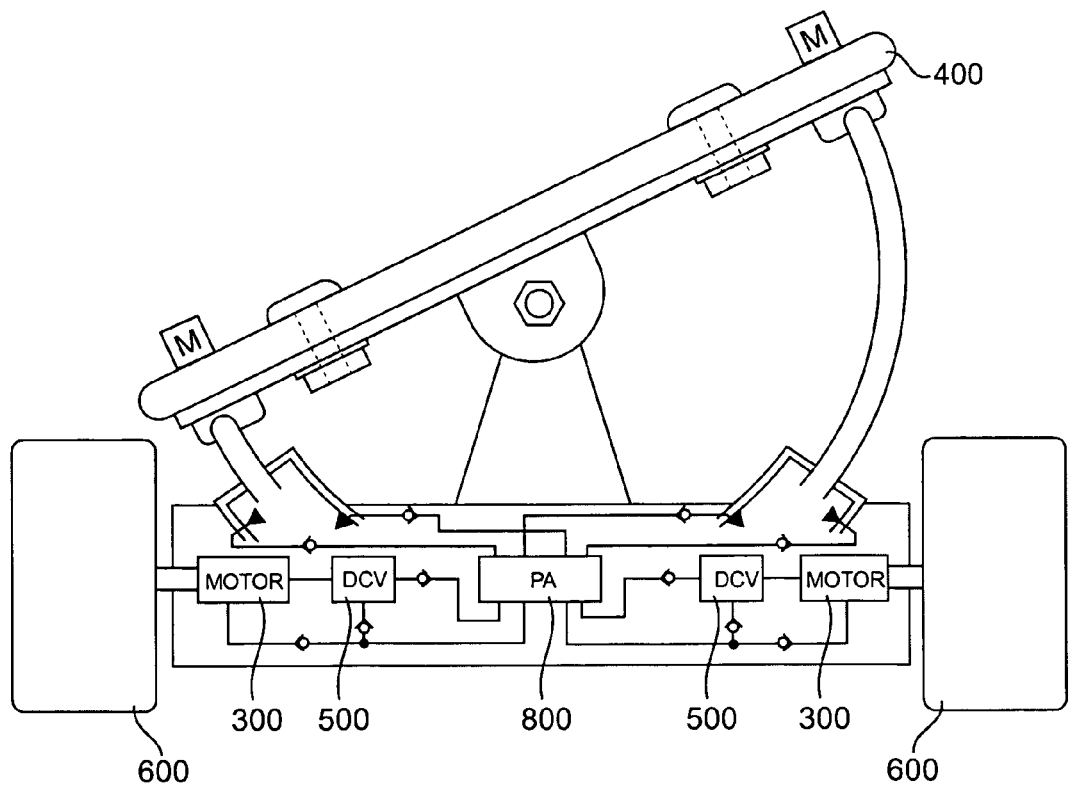
FIG. 11 shows a partial cutaway of a cross sectional end view of a skateboard including hydraulic circuitry symbols illustrating another embodiment.
Figure 12:
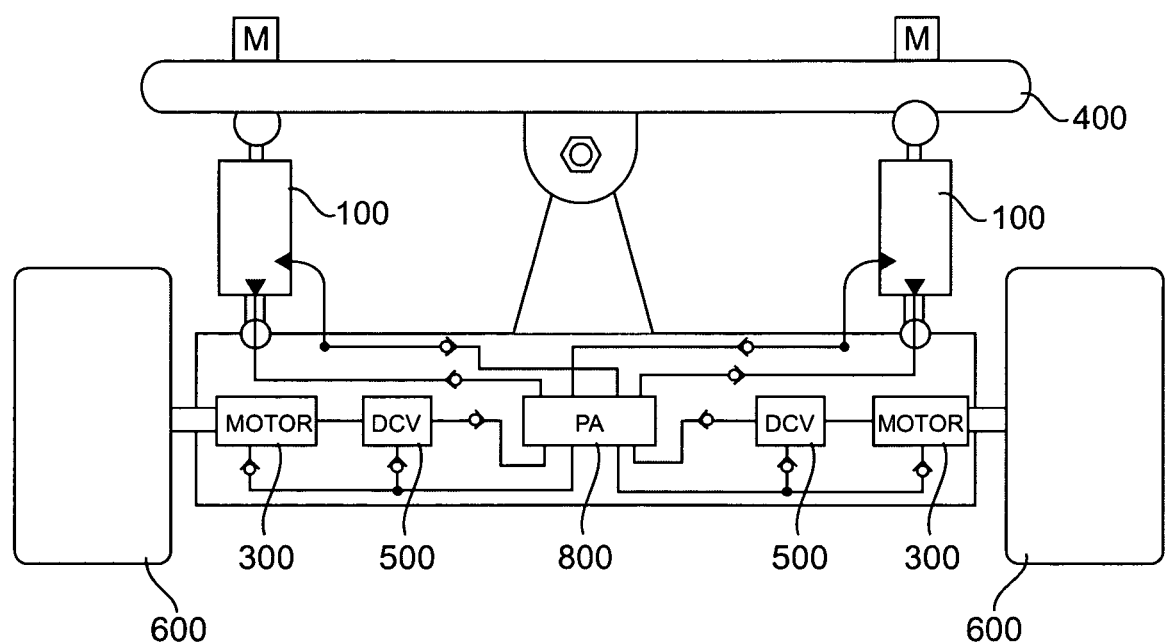
FIG. 12 shows a partial cutaway of a cross sectional end view of a skateboard including hydraulic circuitry symbols illustrating a further embodiment.

FIGS. 11 and 12 illustrate a circuit diagram for another embodiment having a delayed-drive system. The system comprises at least two motors 300, at least two directional control valves 500 and a piston accumulator 800. In this embodiment, the rider propels the skateboard in a delayed and indirect response to the steering of the skateboard, whether turning left or right. In prior embodiments the compression of hydraulic cylinders created pressures that, when in a user defined range of pressure, was in direct fluid communication with the hydraulic motors that propelled the skateboard. In the prior embodiments the skateboard was propelled in immediate response to the compression of the hydraulic cylinders. In this present embodiment the skateboard is propelled in delayed response to the steering of the skateboard.

The delayed response provides a sensation for the rider that is more similar to the gains and losses in speed encountered when turning, curving, and straightening ones path when snowboarding downhill, or surfing ocean waves. In these sports, the motion of turning tends to slow the rider and speed is typically gained when straightening the path of travel when the radius of curvature of the turn increases. The current embodiment is designed to provide a similar sensation.

Functionally it is proposed that the torque provided by the hydraulic motor 300 in the present embodiment will have less force to overcome than prior embodiments and that greater speeds will be possible as a result. As one hydraulic cylinder 100 compresses, the radius of curvature of the skateboard's path of travel decreases. The fluid displaced by compressed hydraulic cylinder 100 is forced, under pressure, into storage, within a functional unit herein referred to as a piston accumulator 800. At that moment in time when the turning motion of the skateboard has its shortest radius of curvature, the centrifugal and gravitational loads of the rider are peaking for that cycle of compression within the turn. Following this peak the rider begins to straighten his turn, expands the formerly compressed hydraulic cylinder 100 and "unweights" his centrifugal and gravitational loads. Skateboard decks or platforms 400 with greater elasticity will accentuate this unloading effect. It is in this next moment following the peak of the centrifugal loading that the piston accumulator 800 releases the stored hydraulic pressure stored within it. This stored hydraulic pressure is able then to act upon a system whose external loads are being lightened, thereby offering the potential of greater speeds, effectively providing a bouncy, sling-shot feeling of propulsion as the rider comes out of his turns. It is this delayed-drive response that will provide a more natural feel similar to that of snowboarding or surfing. Potential energy to propel the skateboard is created when the skateboard is turned either left or right. This potential energy is stored in a device referred to herein as a piston accumulator 800 located in the hydraulic circuits between the hydraulic cylinders 100 on one side and the directional control valves 500 on the other side. Energy is stored in the piston accumulator 800 during the compression of one hydraulic cylinder 100 in a multiple cylinder embodiment or one of the two chambers 102 in the single hydraulic cylinder 100 embodiment and is retained there until the radius of the turn begins to increase when the path of the skateboard begins to straighten coming out of the turn or when the compressed hydraulic cylinder 100 begins to expand. The potential energy is then released from the piston accumulator 800 and made available to one of the hydraulic motors 300.

As illustrated in FIGS. 11 and 12, the delayed-drive system preferably comprises two directional control valves 500, two hydraulic motors 300, two axles 220, at least two wheels 600, and a piston accumulator 800. The delayed-drive system can be used with the single cylinder 100 or the at least two hydraulic cylinder 100 embodiments as shown in FIGS. 1, 5–7, 9, and 10. In operation, the system incorporates a piston accumulator 800 with a hydraulic motor 300 comprising a fixed displacement or a variable displacement configuration. In addition, the hydraulic motors 300 preferably provide torque in one direction of rotation or both directions of rotation. Preferably a hydraulic motor 300 is positioned on each side of the truck housing 200. A rider stands on the skateboard and shifts their body weight left or right to turn the skateboard. The skateboard deck dips to the left or right, respectively, in response to the shift in the rider's weight. Gravitational force, centrifugal force and the force derived from the dipping of the skateboard left or right will actuate hydraulic cylinders 100. The hydraulic cylinder 100 on one side compresses and the other hydraulic cylinder 100 on the other side simultaneously expands the same amount. This pattern of compression and expansion of the two hydraulic cylinders 100 alternates back and forth as the skateboard is turned repeatedly from left to right.

As illustrated in FIGS. 11 and 12, two hydraulic motors 300, located within skateboard truck 200, provide torque independently to drive two different axles 220. Each hydraulic motor 300 drives one axle 220. Throughout this description there are dual and symmetric functional elements. The hydraulic motors 300 can be engaged in delayed and indirect response to the compression of one or the other hydraulic cylinders 100. The compression of hydraulic cylinder chamber 102 builds potential energy within a piston accumulator 800. The potential energy stored in the piston accumulator 800 drives the hydraulic motors 300.

Figure 13:
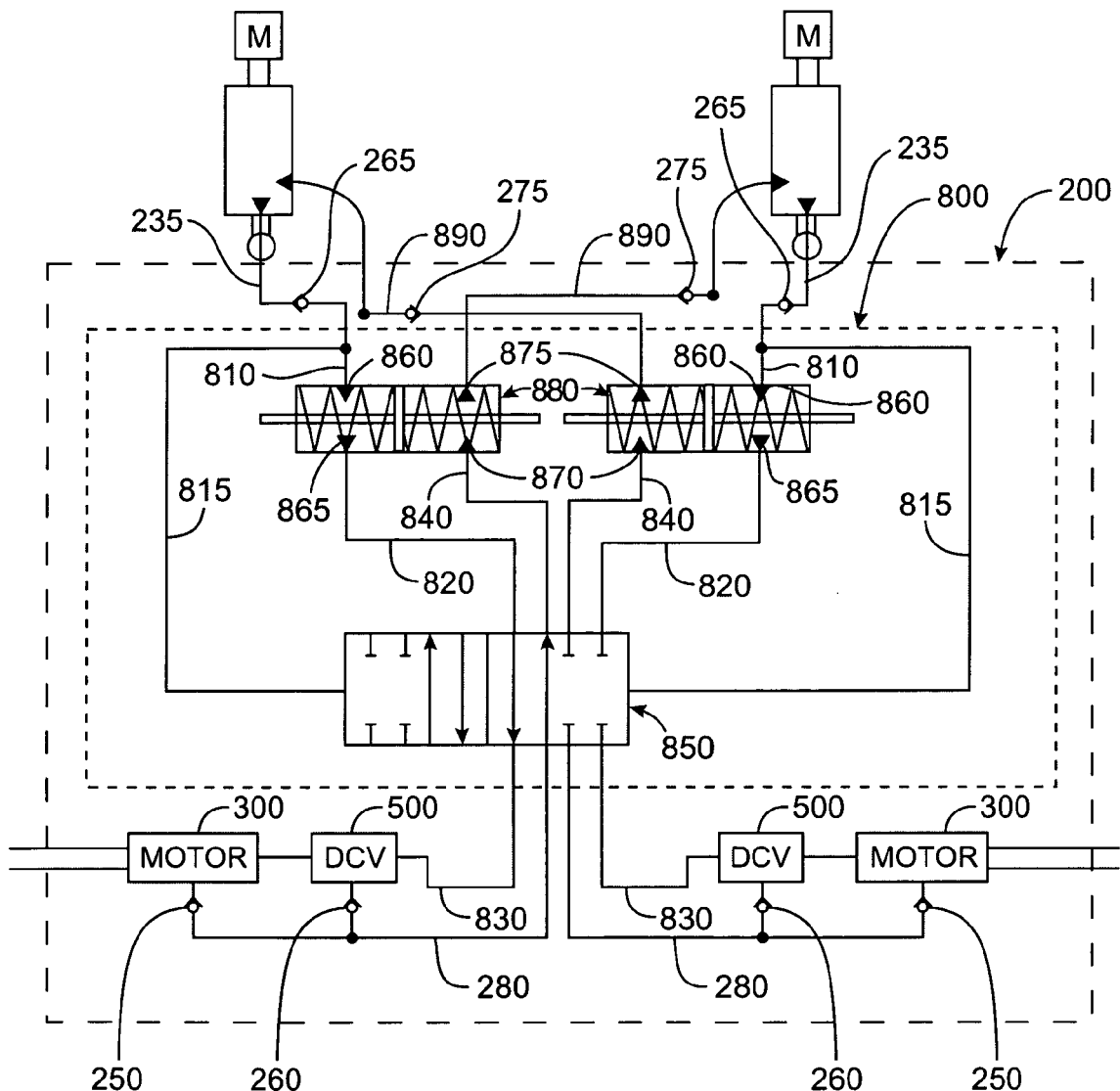
FIG. 13 shows a hydraulic circuitry diagram of a piston accumulator.

FIG. 13 shows the piston accumulator 800 comprising two dual-chambered, double-ended-piston-rod, spring-centered hydraulic cylinders 880, wherein each hydraulic cylinder comprises at least two inlet ports 860, 870, two outlet ports 865, 875, one for each of the two chambers of each double ended hydraulic cylinder 880, a directional control valve 850, and a series of conduits through which hydraulic fluids are directed. It can be appreciated that there are other methods of designing an element herein referred to as a piston accumulator that have the same or similar function of alternately storing and releasing hydraulic potential energy to a hydraulic system without deviating from the present invention. In operation, fluids accumulating in the expanding chamber of the double-ended-piston-rod cylinder 880 are stored under pressure and prevented from escaping the chamber through exit port 865 by the piston accumulator's directional control valve 850, so long as the compressing hydraulic cylinder 100 continues its compression phase. The directional control valve 850 is, itself, controlled by the compression and expansion of hydraulic cylinders 100. During the compression phase of hydraulic cylinder 100 fluids within conduit 815 force the directional control valve into one of two end states. In the first end state, the piston accumulator's directional control valve 850 allows the communication of fluids between one of the two double-ended-piston-rod cylinders 880 in the piston accumulator 800 and one of the directional control valves 500. During this same initial end-state of the piston accumulators directional control valve 500, fluids are prevented from communicating between the other double-ended-piston-rod cylinders 880 in the piston accumulator 800 and the other directional control valve 500.

At the point the rider begins to straighten out of the turning skateboards minimum radius of curvature, the compressed cylinder 100 begins to expand. At this moment the piston accumulator's 800 directional control valve 850 shifts to its second of two end states. In this second end state the roles of the two double-ended-piston-rod hydraulic cylinders 880 reverse. The double-ended-piston-rod hydraulic cylinder 880 that formerly was storing pressurized fluid is now releasing this stored energy through exit port 865 through conduit 820 through the piston accumulator's directional control valve 850 to delivery conduit 830 to directional control valve 500. This fluid either passes through the hydraulic motor 300 or bypasses the hydraulic motor 300 and returns through return conduit 280 back to the piston accumulator's 800 directional control valve 850. This returning fluid passes through the piston accumulator's 800 directional control valve 850 through conduit 840 and then through the inlet port 870 on the expanding side of the double-ended-piston-rod hydraulic cylinder 880.

In operation, the chambers within the two double-ended-piston-rod hydraulic cylinders 880 function very much like the chambers of a heart. A plurality of valves allows the hydraulic fluid to flow into the piston accumulator 800 within the chamber in a single direction. The valves allow the hydraulic fluid to escape with the heart compresses and forces the fluids into the circulatory system. Once the compressed hydraulic cylinder 100 begins to expand, the potential energy stored within the first piston accumulator is made available to engage one of the hydraulic motors and to propel the vehicle. At the same time energy is released from one of the chambers of the piston accumulator 800 on one side of the skateboard truck, the other chamber of the piston accumulator 800 is being stored with potential energy from the compression of the other formerly expanding now compressing hydraulic cylinder 100.

As shown in FIG. 13, the hydraulic fluid is delivered from the hydraulic cylinder or cylinders 100 through the delivery conduit 235 to the piston accumulator 800. The hydraulic fluid exits the piston accumulator through a directional control delivery conduit 830, which connects the piston accumulator 800 to the directional control valve 500. As with the other embodiments, the hydraulic fluid is delivered to the motor 300 via conduit 245. With a piston accumulator 800, the return conduit 280 terminates at the piston accumulator 800 and a return conduit 890 connects the piston accumulator to the hydraulic cylinders 100.

In the single cylinder embodiment shown in FIG. 11 the delivery conduit 830 from the piston accumulator 800 can be connected to either one or the other directional control valves 500. Regardless of which directional control valve 500 the delivery conduit 830 is connected to, the return conduit 280 must lead to the appropriate connection on valve 850 such that fluid passing through one direction control valve 500 returns to the same double ended piston rod cylinder 880 from which it derived. The difference between these two alternative connection schemes determines whether the wheels on the outside of the turn or the wheels on the inside of the turn may be engaged by its respective motor 300. Conceivably, if the wheels 600 and axles 220 connected to the motors 300 on the inside of the turn provide the torque; the vehicle may achieve greater speeds than the alternative connection scheme.

The directional control valve 500 directs the hydraulic fluids through the hydraulic motor 300 or to the bypass conduit 240. As with the other embodiments as shown in FIGS. 5–10, the route the fluid travels will be a function of the hydraulic pressure at the head of the directional valve 500. If pressures are too low or too high the fluid will bypass the motor 300. If pressures are within the manually adjusted operational range, the hydraulic motors will be engaged and impart torque to the drive axle of the hydraulic motor 300.

In a two-cylinder embodiment, compression of either of the hydraulic cylinders 100 will cause hydraulic fluid to discharge from the hydraulic cylinders 100 through a discharge port 320 through the delivery conduit 235 to the piston accumulator 800. Check valves 250, 260, and 275 prevent fluid from flowing the wrong direction in the conduits 235, 240, 245, 890 and 280, the hydraulic motors 300, directional control valve.

Figure 14A:
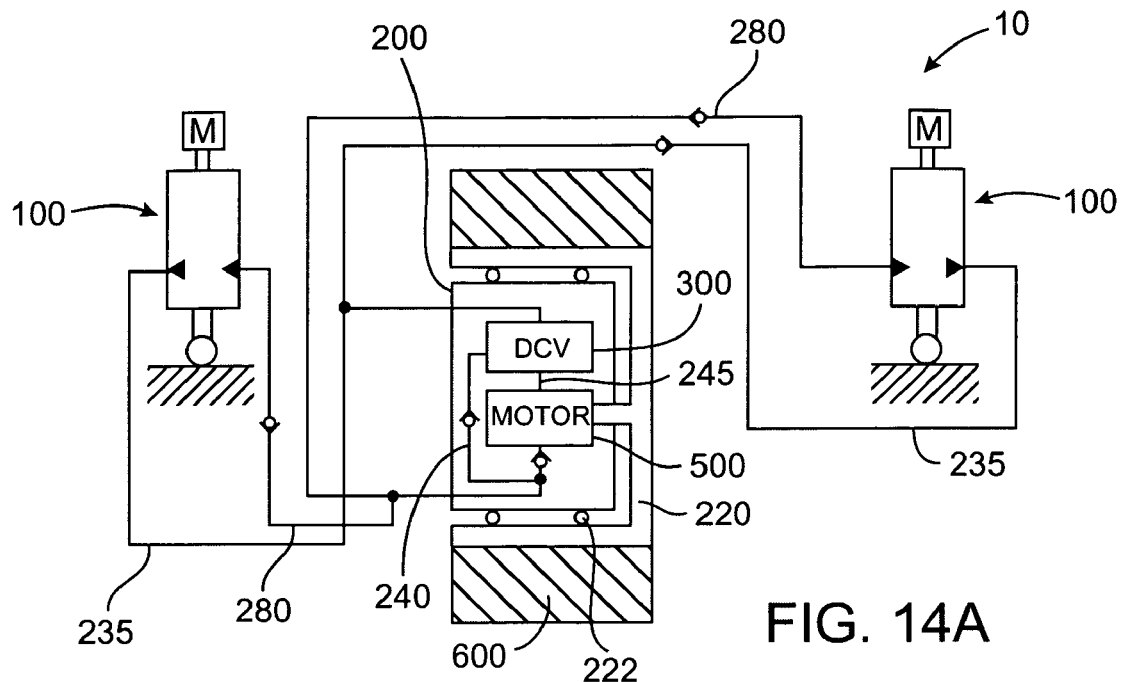
FIGS. 14A–B show a partial cutaway of a cross sectional end view of a single wheeled device including hydraulic circuitry symbols.

FIGS. 14A and B are alternative embodiments of a device 10 comprising a single wheel 600. The hydraulic circuitry of this embodiment may be identical to that shown in FIG. 5, 6, or 7. It can be appreciated that the rotational motor need not drive a wheel, but may drive any axle or rotor of a device that requires rotational force, velocity or torque. The device 10 comprises at least one hydraulic cylinder 100, a hydraulic motor 300, a directional control valve 500 and a wheel 600. In FIGS. 14A and B, the hydraulic motor 300 and directional control valve 500 are located adjacent to or within the wheel 600. As shown, the wheel 600 surrounds the axle 220.

Figure 14B:
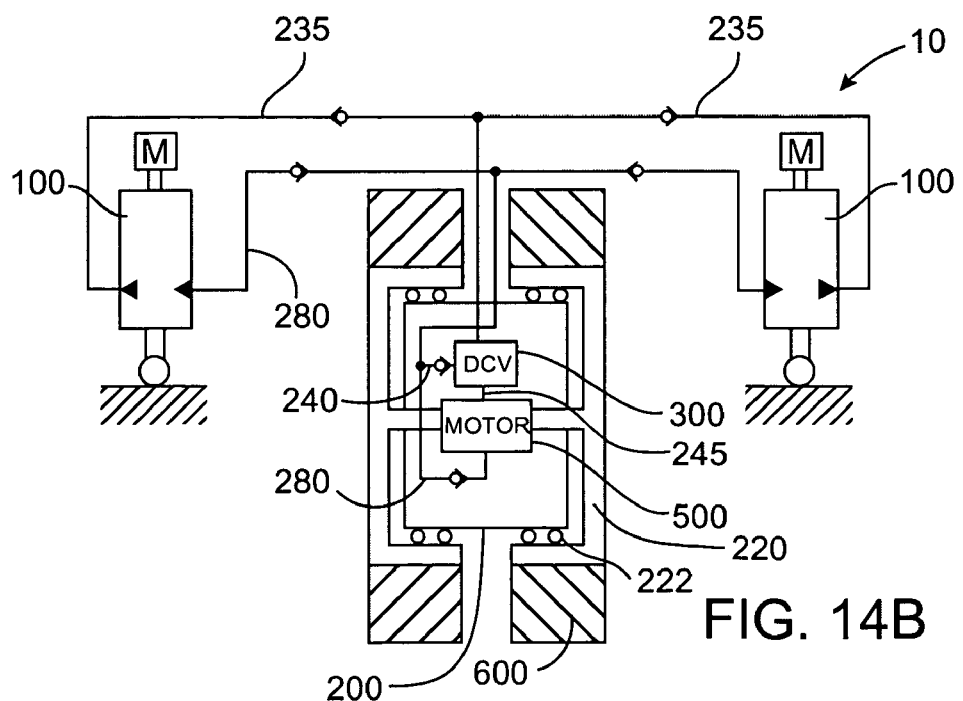

FIGS. 14A and 14B are single wheeled 600 devices comprising two hydraulic cylinders 100, a hydraulic motor 300 and a directional control valve 500 positioned within the interior of the wheel 600. It can be appreciated, as in other embodiments of the device 10 that the system can be constructed with a single hydraulic cylinder.

As shown in FIGS. 14A–B the hydraulic device 10 comprises at least two hydraulic cylinders 100 attachable to a wheel 600 having a hydraulic motor 300 located therein. The hydraulic skateboard comprises a platform 400, at least two hydraulic cylinders 100, and a hydraulic motor 300 located within at least one wheel 600. It can be appreciated that any suitable connection between the hydraulic cylinder 100 and the platform 400 can be used and that any type of hydraulic or pneumatic cylinder can be used.

It can be appreciated that the radial load on the internal components of the motor can be minimized by the extension of the axle 220 to wrap around or surround the housing 200 of the motor 300. In this situation, bearings 222 can be used between the housing 200 and the wrap-around axle 220 to bear the load and significantly reduce radial loading on the axle 200. This aspect of wrapping the axle 220 around the housing 200 can be used on any of FIGS. 1–14 or any hydraulic motor 300 for any function to reduce the radial loads.

FIG. 15 shows a reference table of potential motors that could be used for the hydraulic motor 300 and shown in FIG. 16. Column 1 includes a variety of fixed displacement motors, column 2 includes variable displacement motors, column 3 includes fixed displacement motors with bypass valve 285, and column 4 includes variable displacement motors with bypass valve 285. Five rows are included within Table 15 and FIG. 16. Row A shows the general ISO 1219-1 hydraulic circuitry for motors without specification of details of the motor type. Row B shows single-axle/single-torque-direction motors, Row C shows single-axle/bi-directional-torque motors, Row D shows dual-axle/single-torque-direction motors, and Row E shows dual-axle/bi-directional-torque motors. It can be appreciated that each of the hydraulic motors can be replaced with pneumatic motors and the hydraulic system 120 can be replaced with a similar pneumatic system without departing from the present invention.

Figure 16D:
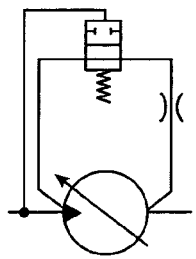
Figure 16H:
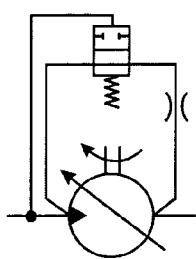
Figure 16L:
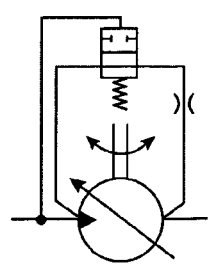
Figure 16C:
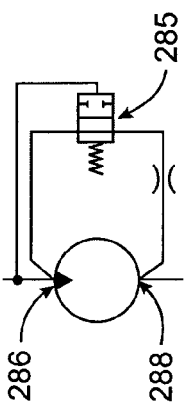
Figure 16G:
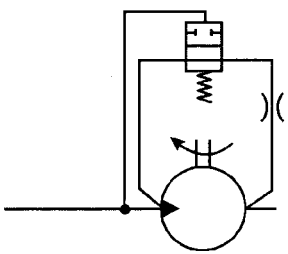
Figure 16K:
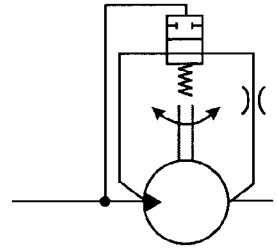
Figure 16B:
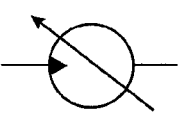
Figure 16F:
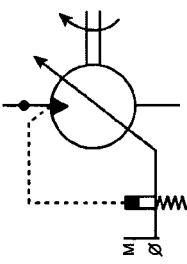
Figure 16J:
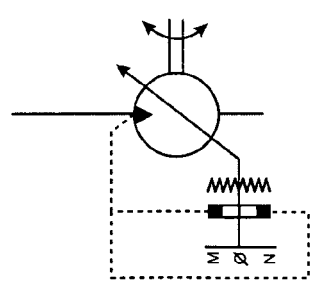
Figure 16A:
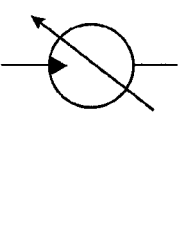
Figure 16E:
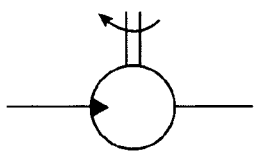
Figure 16I:
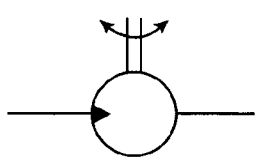
Figure 16P:
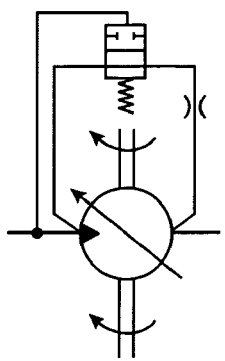
Figure 16T:
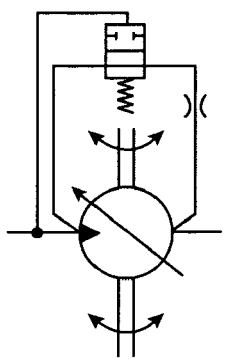
Figure 16O:
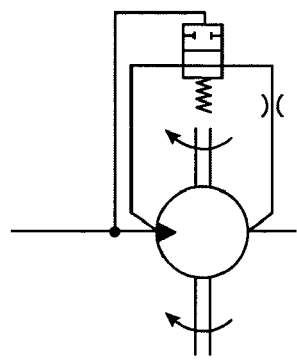
Figure 16S:
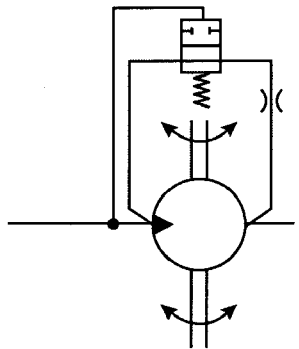
Figure 16N:
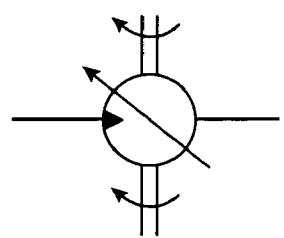
Figure 16R:
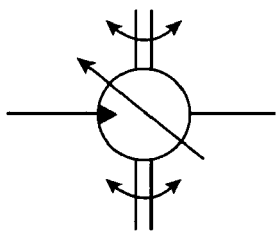
Figure 16M:
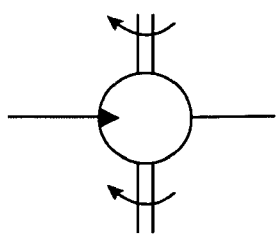
Figure 16Q:
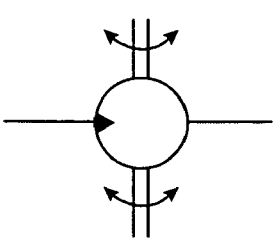

FIGS. 16A–16T is a series of ISO 1219-1 hydraulic circuit diagrams showing many different hydraulic motors referenced by Table 15 that can be used in any of the embodiments as shown in FIGS. 5–7, 9–12, 14. It can be appreciated that other types of motors can be used for the motor 300 other than those shown in FIGS. 15 and 16 without departing from the present invention. It can be appreciated that the motor 300 can be either hydraulic or pneumatic without departing from the present invention.

In addition, the devices and skateboards as shown among FIGS. 1–14 can be equipped with one hydraulic truck and one standard truck, or with two hydraulic trucks. In addition, in an alternate embodiment, the hydraulic motors including any torque generating mechanisms can be entirely located within the skateboard wheel rather than within the truck, enabling the hydraulic motorized wheels on any standard skateboard trucks.

The devices or skateboards as shown among FIGS. 1–14 also can include an on/off switch configured to allow the system to operate in two different modes. In the first mode or "off" mode, the hydraulic system does not engage the motor and wheels, such that the wheels are in a free spin mode. In the second mode or "on" mode, the hydraulic system engages the motor under the user defined pressure ranges.

Figure 17:
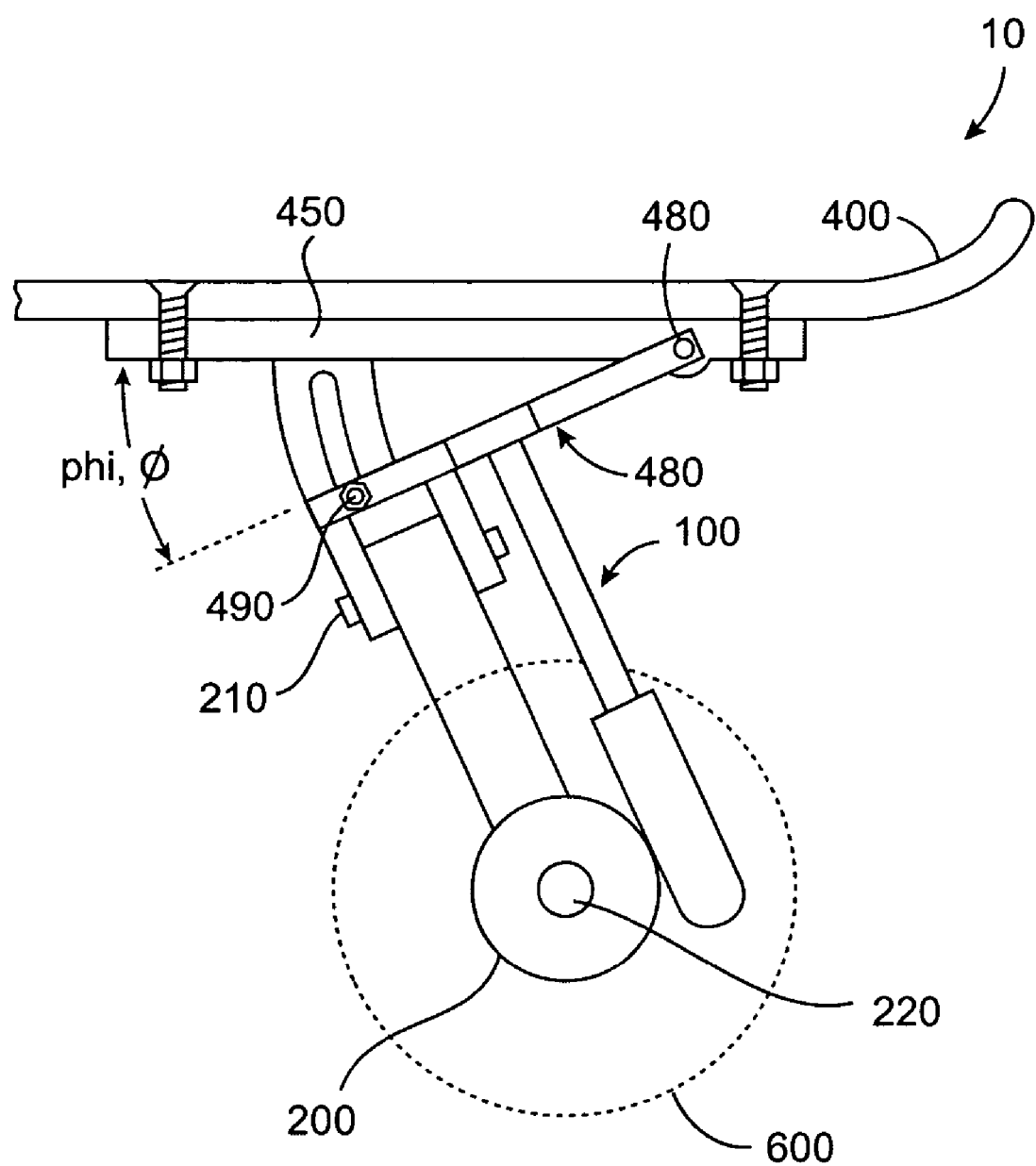
FIG. 17 shows a cross sectional side view of the alternative embodiment of the device as shown in FIGS. 1–3, 5, 9, and 11.

FIG. 17 shows a cross section of an alternative embodiment of the device 10 as shown in FIGS. 1–3, 5, 9, and 11. The device 10 comprises a standard or hydraulic skateboard truck housing 200 configured to enable the adjustment of the pitch angle, phi, of the plane of rotation of truck housing 200 as the truck housing 200 pivots about pivot point 210. When the angle phi is zero, the plane of rotation of the truck housing 200 as it rotates around pivot point 210 is vertical. In this end state the truck will not turn left or right in response to the dipping of the deck 400 to the left or right. In this end state, hydraulic cylinders 100 may engage the hydraulic motors, but the skateboard will travel in virtually a straight path. As the angle, phi ($\phi$), is adjusted to larger angles, the plane of rotation of the truck housing 200 as it pivots around pivot point 210 will deviate from vertical. The larger the angle phi, the more responsive the steering of the skateboard will become to a given dipping motion of the skateboard from the first position to the second position. The occupant can manually adjust the angle, phi ($\phi$), to suite his preferences in the responsiveness of the skateboard's steering to a given change in position (dip) of the skateboard's deck. The truck housing 200 can be attached to the platform 400 by a support plate 450. It can be appreciated that any of the embodiments as shown in FIGS. 1–14 can utilize the pivoting member 480 as shown in FIG. 17.

It can be appreciated that the pivoting member 480 can be manually adjustable to fix the angle phi ($\phi$) to any desired position by suitable connection 490. Alternatively, the pivoting member 480 can comprise a sensor and processing unit to automatically adjust the angle, phi ($\phi$), as a function of the rotational velocity of the axles 220.

Figure 18:
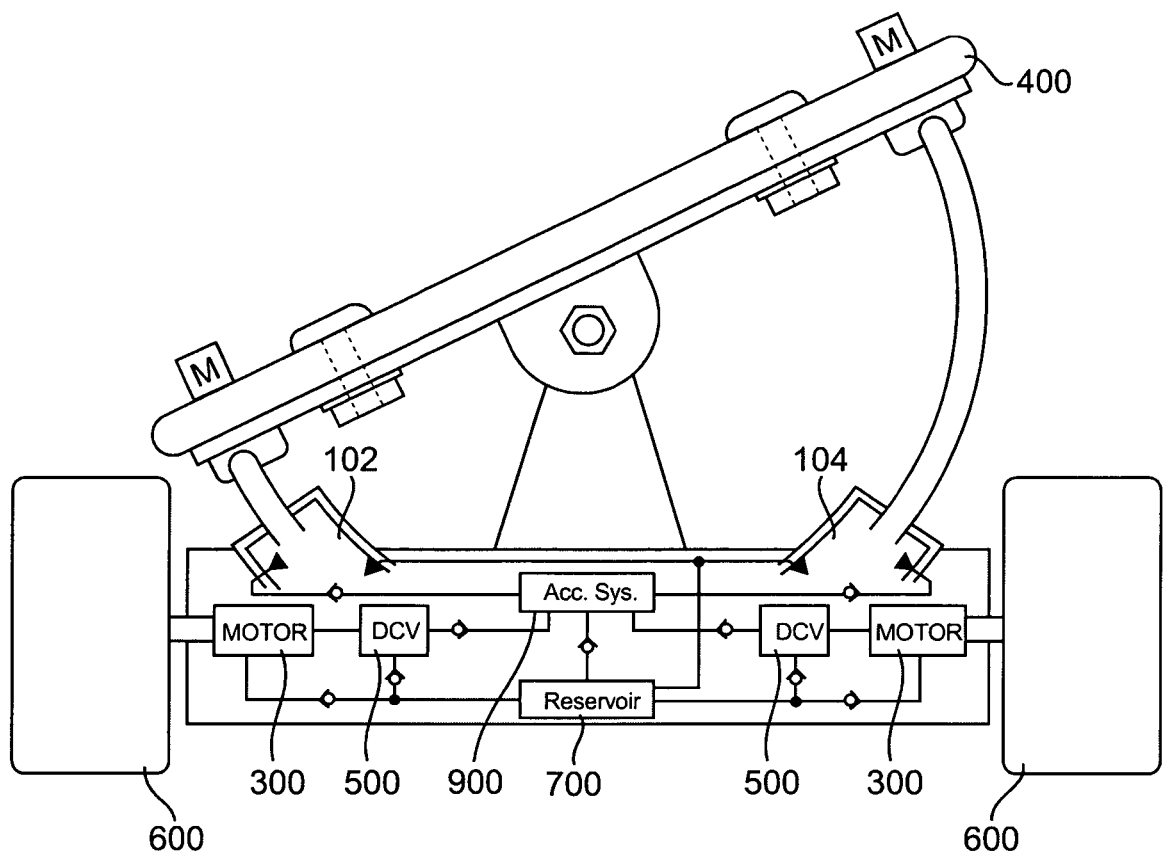
FIG. 18 shows a partial cutaway of a cross sectional end view of a skateboard including hydraulic circuitry symbols illustrating another embodiment.
Figure 19:
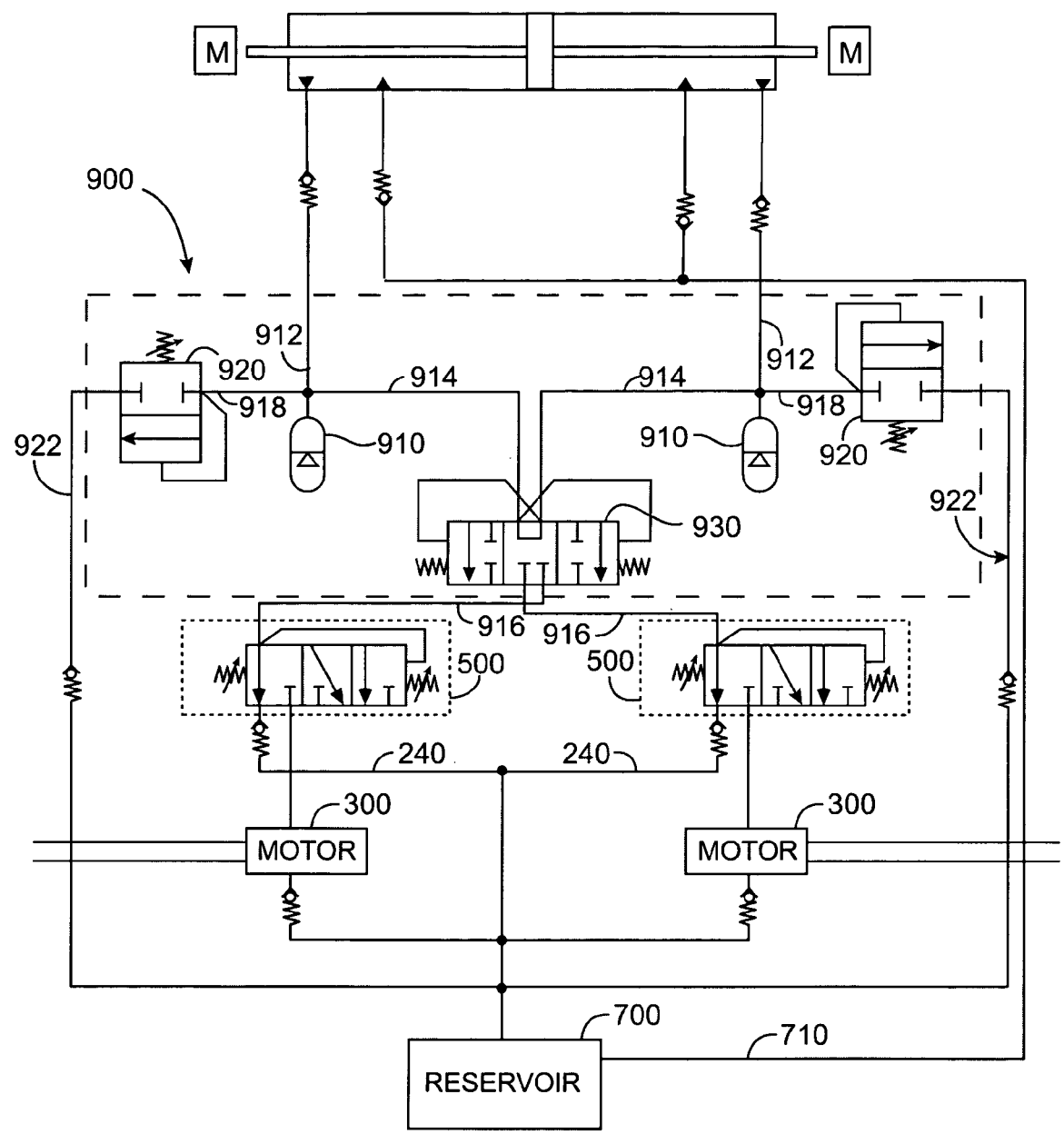
FIG. 19 shows a circuit diagram of a device to generate rotational energy.

FIG. 18 illustrates a circuit diagram for another embodiment of a hydraulic system 120 having a delayed-drive, multiple motors system for a single double-ended-piston-rod hydraulic cylinder 100 and an accumulator system 900. In this embodiment, the rider propels the skateboard in a delayed and indirect response to the steering of the skateboard, whether turning left or right. This is an alternative delayed drive embodiment using hydraulic accumulators 910 as shown in FIG. 19 to store energy rather than double ended piston rods as were used in piston accumulators 800 as shown in FIGS. 11–13.

The delayed response system provides a sensation for the rider that is more similar to the gains and losses in speed encountered when turning, curving, and straightening ones path when snowboarding downhill, or surfing ocean waves. In these sports, the motion of turning tends to slow the rider and speed is typically gained when straightening the path of travel when the radius of curvature of the turn increases. The current embodiment is designed to provide a similar sensation.

Functionally it is proposed that the torque provided by the hydraulic motor 300 in the present embodiment will have less force to overcome than prior direct-drive embodiments and that greater speeds will be possible as a result. As one chamber 102, 104 of the curved double-ended hydraulic cylinder compresses, the radius of curvature of the skateboard's path of travel decreases. The fluid displaced by compressed hydraulic cylinder chamber 102, 104 is forced, under pressure, into storage, within a functional unit herein referred to as an accumulator system 900. At that moment in time when the turning motion of the skateboard has its shortest radius of curvature, the centrifugal and gravitational loads of the rider are peaking for that cycle of compression within the turn. Following this peak the rider begins to straighten his turn, expands the formerly compressed hydraulic cylinder chamber 102, 104 and "unweights" his centrifugal and gravitational loads. Skateboard decks or platforms 400 with greater elasticity will accentuate this unloading effect. It is in this next moment following the peak of the centrifugal loading that the accumulator system 900 releases the stored hydraulic pressure stored within it. This stored hydraulic pressure is able then to act upon a system whose external loads are being lightened, thereby offering the potential of greater speeds, effectively providing a bouncy, sling-shot feeling of propulsion as the rider comes out of his turns. It is this delayed-drive response that will provide a more natural feel similar to that of snowboarding or surfing. Potential energy to propel the skateboard is created when the skateboard is turned either left or right. This potential energy is stored in the accumulator system 900 located in the hydraulic circuits between the hydraulic cylinders chambers 102, 104 on one side, and the directional control valves 500 on the other side. Energy is stored in the accumulator system 900 during the compression of one hydraulic cylinder chamber 102, 104 in a single cylinder embodiment or one of the two cylinders 100 in the multiple hydraulic cylinder 100 embodiment and is retained there until the radius of the turn begins to increase when the path of the skateboard begins to straighten coming out of the turn or when the compressed hydraulic cylinder chamber 102, 104 begins to expand. The potential energy is then released from the accumulator system 900 and made available to one of the hydraulic motors 300. It can be appreciated that the hydraulic energy stored in the accumulator system 900 can be released to multiple motors 300 at the same time without deviating from this invention.

As illustrated in FIG. 18, the delayed-drive system preferably comprises two directional control valves 500, two hydraulic motors 300, two axles 220, at least two wheels 600, a reservoir 700 and the accumulator system 900. The delayed-drive system can be used with the single cylinder 100 or the at least two hydraulic cylinder 100 embodiments as shown in FIG. 1–10. In operation, the system incorporates a reservoir 700 and an accumulator system 900 with a hydraulic motor 300 comprising a fixed displacement or a variable displacement configuration. In addition, the hydraulic motors 300 preferably provide torque in one direction of rotation or both directions of rotation. Preferably a hydraulic motor 300 is positioned on each side of the truck housing 200. A rider stands on the skateboard and shifts their body weight left or right to turn the skateboard. The skateboard deck dips to the left or right, respectively, in response to the shift in the rider's weight. Gravitational force, centrifugal force and the force derived from the dipping of the skateboard left or right will actuate hydraulic cylinder chambers 102, 104. The hydraulic cylinder chamber 102, 104 on one side compresses and the other hydraulic cylinder chamber 102, 104 on the other side simultaneously expands the same amount. This pattern of compression and expansion of the two hydraulic cylinder chambers 102, 104 alternates back and forth as the skateboard is turned repeatedly from left to right.

As illustrated in FIG. 18, two hydraulic motors 300, located within skateboard truck 200, provide torque independently to drive two different axles 220. Each hydraulic motor 300 drives one axle 220. Throughout this description there are dual and symmetric functional elements. The hydraulic motors 300 can be engaged in delayed and indirect response to the compression of one or the other hydraulic cylinder chambers 102, 104. The compression of the hydraulic fluid within the hydraulic cylinder chamber 102, 104 builds potential energy within the accumulator system 900. The potential energy stored in the accumulator system 900 drives the hydraulic motors 300.

FIG. 19 shows the accumulator system 900 comprising two gas accumulators 910, two pressure relief valves 920, a single 3-position-4-port valve 930, and a series of conduits 912, 914, 916, 918, 922. It can be appreciated that there are other methods of designing an element herein referred to as an accumulator system 900 that have the same or similar function of alternately storing and releasing hydraulic potential energy to a hydraulic system. Hydraulic fluid is forced out of the compressed cylinder chamber 102, 104 through conduit 912 and into one of the two gas accumulators 910.

In operation, fluids accumulating in the gas accumulator 910 are stored under pressure and prevented from escaping, so long as the compressing hydraulic cylinder chamber 102, 104 continues its compression phase, or unless accumulated pressure exceeds some maximum threshold defined by the pressure relief valve 920. If pressures in the gas accumulator 910 do exceed maximum threshold pressures defined by the pressure relief valve 920, some hydraulic fluid is released from the gas accumulator 910, through conduit 918, through the relief valve 920, through conduit 922 into the reservoir 700. When enough excessive pressure in the gas accumulator 910 has been release through the relief valve 920, the relief valve 920 closes. When the hydraulic cylinder chamber 102, 104 begins its expansion phase, pressurized hydraulic fluid in the gas accumulator 910 is released through conduit 914, to the 3-position-4-port valve 930. The 3-position-4-port valve 930 is, itself, controlled by the compression and expansion of hydraulic cylinders chambers 102, 104. During the compression phase of hydraulic cylinder chamber 102, 104 fluids within conduit 914 force the 3-position-4-port valve 930 into one of two end states. In the first end state, the 3-position-4-port valve 930 allows the communication of fluids between one of the gas accumulators 910 in the accumulator system 900 and one of the directional control valves 500. During this same initial end-state of the 3-position-4-port valve 930, fluids are prevented from communicating between the other gas accumulator 910 and the other directional control valve 500. It can be appreciated that any suitable hydraulic accumulator or device that stores energy in the form of fluid under pressure can be used in place of the gas accumulator 910, including but not limited to spring loaded and weight loaded accumulators, without deviating from this invention.

At the point the rider begins to straighten out of the turning skateboards minimum radius of curvature, the compressed cylinder chamber 102, 104 begins to expand. At this moment the 3-position-4-port valve 930 shifts to its second of two end states. In this second end state the roles of the two gas accumulators 910 reverse. The gas accumulator 910 that formerly was storing pressurized fluid is now releasing this stored energy through conduit 914, through the 3-position-4-port valve 930, through conduit 916 to directional control valve 500. This fluid either passes through the hydraulic motor 300 or bypasses the hydraulic motor 300 and through additional conduits to the reservoir 700. Fluid stored in the reservoir 700 is drawn into the expanding hydraulic cylinder chamber 102, 104 through conduit 710.

Once the compressed hydraulic cylinder 102, 104 begins to expand, the potential energy stored within the first gas accumulator 910 is made available to engage one of the hydraulic motors and to propel the vehicle. At the same time energy is released from one of the gas accumulators 910 on one side of the skateboard truck, the other gas accumulator 910 is being stored with potential energy from the compression of the other formerly expanding, now compressing, hydraulic cylinder 102, 104.

The directional control valve 500 directs the hydraulic fluids through the hydraulic motor 300 or to the bypass-conduit 240. As with the other embodiments as shown in FIGS. 5–13, the route the fluid travels will be a function of the hydraulic pressure at the head of the directional valve 500. If pressures are too low or too high the fluid will bypass the motor 300. If pressures are within the manually adjusted operational range, the hydraulic motors will be engaged and impart torque to the drive axle of the hydraulic motor 300.

It can be appreciated that any of the devices 10 as shown among FIGS. 1–14, 18 and 19 can further comprise a hydraulic braking system. The hydraulic braking system comprises a hydraulic brake, which clamps onto or presses against the drive shaft of the motor axle 220 or any other rotating elements of the hydraulic truck 300, axle 220 or wheel 600. It can be appreciated that the hydraulic braking system can be used in both the "on" and "off" modes. The hydraulic braking system can be activated by a hand held control; a foot brake located on the skateboard deck 400, or other suitable device for activating the braking system as disclosed in U.S. patent application Ser. No. 10/980,626, filed Nov. 2, 2004, which is incorporated herein in its entirety.

In an alternative embodiment, the braking system is controlled by a brake pad or lever located on the platform 400 or skateboard deck. The brake plate or lever rotates about a vertical axis to actuate the hydraulic braking system. In operation, the rider can position his or her trailing foot on or next to the brake plate or lever and upon a twist of the foot; the brake plate rotates sending an impulse to the hydraulic braking system. The hydraulic braking system slows the skateboard and provides the rider with a sensation of a stopping or slowing motion.

Although the platform 400 has been shown to be a skateboard deck, it can be appreciated that the platform 400 can be any type of platform such as a plain deck for moving furniture and other items, or an in-line skate where the wheels with a flat footprint remain in contact with the road and the hydraulic pressure created by the inline boot leaning from left to right and vice-versa creates a linear hydraulic pressure that is converted to rotational force within each of the in-line skates. In addition, any suitable apparatus or device, which compresses and expands the at least one hydraulic cylinder 100 can be used, such that the device and systems as described herein can include not only land based devices but also water craft such as paddle boats, wherein a hydraulic fluid is converted into a rotational torque.

The hydraulic system 120 can be applied to other human powered devices that convert energy generated by compressing and expanding single or multiple hydraulic cylinders into rotational energy via hydraulic motors. Such as motors to drive pumps, pottery wheels, wheeled equipment to move office or work equipment, hand trucks, or any device that can benefit from the rotational energy, such as sewing machines or ice cream makers. In addition, it can be appreciated that any of the embodiments as shown can be incorporated into an inline skate, roller skate, or any device comprising a plurality of wheels.

While the invention has been described with reference to the preferred embodiments described above, it will be appreciated that the configuration of this invention can be varied and that the scope of this invention is defined by the following

The invention claimed is:

1. A device for generating rotational energy for hydraulic fluids comprising:
   at least one hydraulic cylinder, the at least one hydraulic cylinder comprising at least two chambers, wherein each of the at least two chambers are in fluid communication with the other; and an accumulator system comprising:
- at least two accumulators configured to receive the hydraulic fluid from the at least one hydraulic cylinder;
- a valve adapted to receive the hydraulic fluid from the at least two accumulators;
- at least one hydraulic motor adapted to receive the hydraulic fluid from the valve, wherein the hydraulic motor is configured to rotate by the displaced hydraulic fluid creating torque;
- a reservoir adapted to receive the hydraulic fluid from the at least one hydraulic motor and return the hydraulic fluid to the at least one hydraulic cylinder;
- a platform attachable to the at least one hydraulic cylinder at a first connection point and a second connection point, wherein movement of the platform from a first position to a second position causes one of the at least two chambers to displace a hydraulic fluid to the other chamber; and
- a housing having at least one axle adapted to receive at least one wheel.

2. The device of claim 1, wherein the accumulators are gas loaded.

3. The device of claim 1, further comprising a pair of directional control valves configured to direct the flow of the hydraulic fluid to engage or bypass the hydraulic motor.

4. The device of claim 3, wherein the valve system is configured to allow communication of hydraulic fluid between one of the accumulators and the directional control valve and prevent communication of hydraulic fluid between the other accumulator and the other direction control valve.

5. The device of claim 3, wherein the directional control valve further comprises a control valve configured to adjust a defined working pressure range within which the at least one hydraulic motor receives hydraulic fluid and an outside pressure range within which the hydraulic fluid bypasses the hydraulic motor.

6. The device of claim 1, wherein the at least one hydraulic cylinder is a double-ended-piston-rod hydraulic cylinder.

7. The device of claim 6, wherein the at least two chambers of the double-ended-piston-rod hydraulic cylinder are separated by a piston.

8. The device of claim 1, wherein the at least one hydraulic cylinder comprises at least two hydraulic cylinders.

9. The device of claim 1, wherein the platform is a deck of a skateboard.

10. A method of powering a device comprising:
providing a hydraulic system comprising:
- at least one hydraulic cylinder, the at least one hydraulic cylinder comprising at least two chambers, wherein each of the at least two chambers are in fluid communication with the other;
- at least two accumulators configured to receive the hydraulic fluid from the at least one hydraulic cylinder;
- a valve system adapted to receive the hydraulic fluid from the at least two accumulators;
- at least one hydraulic motor adapted to receive the hydraulic fluid from the valve system, wherein the hydraulic motor is configured to rotate by the displaced hydraulic fluid creating torque; and
- a reservoir adapted to receive the hydraulic fluid from the at least one hydraulic motor and return the hydraulic fluid to the at least one hydraulic cylinder;
- compressing one chamber of the at least one hydraulic cylinder;
- expanding the other chamber of the at least one hydraulic cylinder, wherein the compressing and expanding of the two chambers displaces a hydraulic fluid to the at least two accumulators to release a pressurized hydraulic fluid to the valve system and at least one hydraulic motor to create torque; and
- wherein the expanding and compressing of the at least one hydraulic cylinder is performed by dipping a platform from side to side.

11. The method of claim 10, further comprising displacing the hydraulic fluid through a directional control valve adapted to direct the fluid to the motor or to a bypass valve and the reservoir.

12. The method of claim 10, wherein the torque from the hydraulic motor drives a wheel.

13. The method of claim 10, further comprising storing the pressurized hydraulic fluid before releasing the hydraulic fluid to the valve system and at least one hydraulic motor.

14. The method of claim 10, wherein the platform is a skateboard deck.

15. A device for generating rotational energy for hydraulic fluids comprising:
- a skateboard deck, wherein movement of the skateboard deck from a first position to a second position causes a hydraulic fluid to be displaced;
- at least one hydraulic motor adapted to receive the hydraulic fluid, wherein the hydraulic motor is configured to rotate by the displaced hydraulic fluid creating torque; and
- a housing having at least one axle adapted to receive at least one wheel.

16. The device of claim 15, wherein the torque from the at least one hydraulic motor directly or indirectly rotates the at least one wheel.

17. The device of claim 15, further comprising a directional control valve configured to direct the flow of hydraulic fluid to engage or bypass the hydraulic motor.

18. The device of claim 17, wherein the directional control valve further comprises a pair of springs configured to adjust a defined working pressure range within which the at least one hydraulic motor receives hydraulic fluid and an outside pressure range within which hydraulic fluids bypass the hydraulic motor.

19. The device of claim 15, further comprising an accumulator adapted to store a pressurized hydraulic fluid, wherein the accumulator stores and releases the pressurized hydraulic fluid to the hydraulic motor.

20. A method of powering a device comprising:
providing a hydraulic system comprising:
- a skateboard deck, wherein movement of the skateboard deck from a first position to a second position causes a hydraulic fluid to be displaced;
- at least one hydraulic motor adapted to receive the hydraulic fluid, wherein the hydraulic motor is configured to rotate by the displaced hydraulic fluid creating torque; and
- a housing having at least one axle adapted to receive at least one wheel; and
- displacing the hydraulic fluid by dipping the skateboard deck from side to side.

21. The method of claim 20, wherein the torque from the at least one hydraulic motor directly or indirectly rotates the at least one wheel.

22. The method of claim 20, further comprising a directional control valve configured to direct the flow of hydraulic fluid to engage or bypass the hydraulic motor.

23. The method of claim 22, wherein the directional control valve further comprises a pair of springs configured to adjust a defined working pressure range within which the at least one hydraulic motor receives hydraulic fluid and an outside pressure range within which hydraulic fluids bypass the hydraulic motor.

24. The method of claim 20, further comprising an accumulator adapted to store a pressurized hydraulic fluid, wherein the accumulator stores and releases the pressurized hydraulic fluid to the hydraulic motor.

* * * * *